(12) United States Patent
Kim et al.

(10) Patent No.: US 12,710,127 B2
(45) Date of Patent: Aug. 18, 2026

(54) DISPLAY DEVICE

(71) Applicant: SAMSUNG ELECTRONICS CO., LTD., Suwon-si (KR)

(72) Inventors: Taehun Kim, Suwon-si (KR); Dongwook Kim, Suwon-si (KR); Jisoo Kim, Suwon-si (KR); Chulyong Cho, Suwon-si (KR); Gyoosang Choi, Suwon-si (KR); Soonseok Seo, Suwon-si (KR); Bokyung Seong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 84 days.

(21) Appl. No.: 18/651,106

(22) Filed: Apr. 30, 2024

(65) Prior Publication Data

US 2024/0280212 A1 Aug. 22, 2024

Related U.S. Application Data

(63) Continuation of application No. PCT/KR2022/017223, filed on Nov. 4, 2022.

(30) Foreign Application Priority Data

Dec. 27, 2021 (KR) ........................ 10-2021-0188380

(51) Int. Cl.
*F16M 11/12* (2006.01)
*F16M 11/22* (2006.01)

(52) U.S. Cl.
CPC ........... *F16M 11/126* (2013.01); *F16M 11/22* (2013.01); *F16M 2200/02* (2013.01)

(58) Field of Classification Search
CPC .. F16M 11/126; F16M 11/22; F16M 2200/02; F16M 11/105; F16M 11/2021;
(Continued)

(56) References Cited

U.S. PATENT DOCUMENTS 4,589,713 A * 5/1986 Pfuhl .................... H01R 35/02 439/162
5,854,735 A * 12/1998 Cheng .................... F16M 11/10 248/371
(Continued)

FOREIGN PATENT DOCUMENTS

EP 1 855 045 A1 11/2007
JP 2016-40866 A 3/2016
(Continued)

OTHER PUBLICATIONS

Communication dated Dec. 11, 2024, issued by the European Patent Office in European Application No. 22916379.5.
(Continued)

*Primary Examiner* — Muhammad Ijaz
(74) *Attorney, Agent, or Firm* — Sughrue Mion, PLLC

(57) ABSTRACT

A display apparatus includes: a display module including a display panel and a display case supporting the display panel and including a locking portion; and a support device supporting a rear of the display module and configured to enable pivot rotation of the display module, wherein the support device includes: a support arm configured to be rotatably coupled to a support object and enable the display module to move between a first position and a second position at a lower height than the first position, and a locking member inserted into the locking portion and configured to lock the pivot rotation of the display module when the display module is in the second position.

19 Claims, 23 Drawing Sheets

(58) Field of Classification Search
CPC ............... F16M 11/2092; F16M 11/24; F16M 2200/024; F16M 2200/041; F16M 2200/063; F16M 11/125; H04N 5/64
USPC .......................................... 248/127, 917–924
See application file for complete search history.

(56) References Cited

U.S. PATENT DOCUMENTS 5,923,528 A * 7/1999 Lee ....................... G06F 1/1601 248/921
6,189,842 B1 * 2/2001 Bergeron Gull ....... F16M 11/24 248/283.1
6,822,857 B2 * 11/2004 Jung ...................... F16M 11/24 248/920
7,490,796 B2 * 2/2009 Kim ..................... F16M 11/105 248/292.12
7,643,276 B2 1/2010 Shin
7,644,897 B2 1/2010 Shin
7,766,288 B2 * 8/2010 Kim ................... F16M 11/2064 248/176.1
7,815,154 B2 * 10/2010 Oh ......................... F16M 11/28 248/176.3
7,963,488 B2 6/2011 Hasegawa et al.
8,328,151 B2 12/2012 Gwag
8,794,579 B2 * 8/2014 Sturman .............. F16M 11/041 248/921
8,960,618 B2 * 2/2015 Chen ...................... F16M 13/02 248/222.51
9,010,597 B2 * 4/2015 Prescott .................. B60R 7/088 224/547
9,702,501 B2 * 7/2017 Ho ..................... F16M 11/2014
10,645,828 B2 5/2020 Kim et al.
11,350,536 B2 5/2022 Choi et al.
11,808,516 B2 * 11/2023 Lee ....................... F25D 29/005
12,000,525 B2 * 6/2024 Shih ..................... F16M 11/041
12,309,951 B2 * 5/2025 Lee ........................ F16M 11/24
12,405,630 B2 * 9/2025 Lee .................... F16M 11/2021
2004/0084585 A1 * 5/2004 Watanabe ............ F16M 11/105 248/917
2005/0201046 A1 * 9/2005 Hwang ................ F16M 11/105 361/679.06
2007/0064379 A1 3/2007 Shin
2007/0262209 A1 * 11/2007 She .................... F16M 11/2057 248/122.1
2007/0262210 A1 * 11/2007 Oh ......................... F16M 11/28 248/917
2007/0262225 A1 * 11/2007 Tsuo .................... F16M 11/105 248/676
2007/0291445 A1 * 12/2007 Chen .................... F16M 11/242 361/679.27
2012/0224323 A1 * 9/2012 Yang ...................... F16M 13/00 361/679.55
2015/0211675 A1 * 7/2015 Shyu .................... F16M 11/105 248/125.7
2016/0345450 A1 * 11/2016 Wang ..................... F16M 11/24
2017/0329364 A1 * 11/2017 Kim ....................... F16M 11/22
2021/0160451 A1 5/2021 Yoon et al.
2021/0244186 A1 * 8/2021 Pei ......................... F16M 11/22
2022/0412502 A1 * 12/2022 Shih ..................... F16M 11/041
2024/0280212 A1 * 8/2024 Kim ..................... F16M 11/126
2025/0071919 A1 * 2/2025 Lee ...................... F16M 11/041
2025/0126731 A1 * 4/2025 Kwon .................... F16M 11/38

FOREIGN PATENT DOCUMENTS

| | | | |
|---|---|---|---|
| KR | 2001-0108901 | A | 12/2001 |
| KR | 10-0565686 | B1 | 3/2006 |
| KR | 10-0630938 | B1 | 10/2006 |
| KR | 10-0813717 | B1 | 3/2008 |
| KR | 10-2009-0076759 | A | 7/2009 |
| KR | 10-2010-0088003 | A | 8/2010 |
| KR | 10-1164820 | B1 | 7/2012 |
| KR | 10-1253569 | B1 | 4/2013 |
| KR | 10-2019-0024475 | A | 3/2019 |
| KR | 10-2019-0098373 | A | 8/2019 |
| KR | 10-2020-0004567 | A | 1/2020 |
| KR | 10-2237598 | B1 | 4/2021 |
| WO | 2013/032465 | A1 | 3/2013 |

OTHER PUBLICATIONS

Communication dated Jul. 25, 2025 issued by the European Patent Office in European Patent Application No. 22916379.5.

International Search Report (PCT/ISA/210) dated Feb. 15, 2023, issued by the International Searching Authority in International Application No. PCT/KR2022/017223.

Written Opinion (PCT/ISA/237) dated Feb. 15, 2023, issued by the International Searching Authority in International Application No. PCT/KR2022/017223.

Office Action dated Nov. 19, 2025, issued by Korean Ministry of Intellectual Property in Korean Patent Application No. 10-2021-0188380.

* cited by examiner

DISPLAY DEVICE

CROSS-REFERENCE TO RELATED APPLICATIONS

This application is a continuation of International Application No. PCT/KR2022/017223, filed on Nov. 4, 2022, which is based on and claims priority to Korean Patent Application No. 10-2021-0188380, filed on Dec. 27, 2021 in the Korean Intellectual Property Office, the disclosures of which are incorporated by reference herein in their entireties.

BACKGROUND ART

1. Field

The disclosure relates to a display apparatus, and more particularly, to a display apparatus including a support device for supporting a display module.

2. Description of Related Art

In general, a display apparatus visually displays obtained or stored image information to a user. The display apparatus may be a monitor or television, and is used in various fields such as homes and businesses.

The display apparatus may include a display module for displaying images and a support device for supporting the display module. The display module may include a display panel and a display case supporting the display panel.

Self-light emitting display panels such as organic light-emitting diodes (OLEDs) and received-light emitting display panels such as liquid crystal display (LCD) panels are used as display panels.

The display case may include a top chassis supporting front and side surfaces of the display panel, a bottom chassis supporting the rear of the display panel, and a rear cover coupled to the rear of the bottom chassis to cover the rear of the display module.

The support device may be provided to support the display module so that a front surface of the display module on which images are displayed may face viewers.

The support device may include a support arm such that the user may adjust a height of the display module. In a case in which the display module has a structure capable of pivot-rotating the display module with respect to the support arm, when the display module pivot-rotates in a state of not being located high enough from a floor, the display module may collide with the floor.

SUMMARY

Provided is a display apparatus having a structure which may be capable of adjusting a height of a display module and pivot-rotating the display module with respect to a support device.

Further, provided is a display apparatus having a structure which may be capable of pivot-rotating a display module only above a specific height.

According to an aspect of the disclosure, a display apparatus includes: a display module including a display panel and a display case supporting the display panel and including a locking portion; and a support device supporting a rear of the display module and configured to enable pivot rotation of the display module, wherein the support device includes: a support arm configured to be rotatably coupled to a support object and enable the display module to move between a first position and a second position at a lower height than the first position, and a locking member inserted into the locking portion and configured to lock the pivot rotation of the display module when the display module is in the second position.

The display case may include: a rear cover on a rear of the display panel; and a fixed plate fixed to the rear cover and configured to enable pivot rotation with respect to the support device, and the locking portion may be provided on the fixed plate.

The locking portion may be provided on a rear surface of the fixed plate facing the rear cover.

The locking member may be configured to move from the rear to a front of the display module when the display module moves from the first position to the second position.

The locking portion may include a locking groove formed concavely, and the locking member may be configured to be inserted in the locking groove when the display module is in the second position.

The support device may further include a support plate rotatably coupled to a rear of the display case, and the support plate may include a passing hole configured to allow the locking member to pass through.

The support arm may include a guide protrusion configured to rotate integrally with the support arm, the locking member may include a guide groove configured to have the guide protrusion inserted therein, and the guide protrusion may be further configured to guide the locking member to move to an opposite side of the locking portion while being inserted into the guide groove, and guide the locking member to move toward the locking portion while deviating from the guide groove.

The guide groove may be concavely formed from a lower portion toward an upper portion of the locking member, and the guide protrusion may be inserted from below the guide groove.

The guide groove may extend from the lower portion of the locking member toward a rear of the locking member.

The locking member may include: a protrusion portion configured to be insertable into the locking portion; and a body portion extending from the protrusion portion toward the support arm, and the guide groove may be provided on the body portion.

The support device may include: a support bracket to which a first end of the support arm is rotatably coupled and configured to be fixed to the support object, and a support link rotatably coupled to a second end of the support arm on the support bracket, and the locking member may be movably coupled to the support link.

The locking member may include a support groove on a coupling surface coupled to the support link and extending along a moving direction of the locking member, and the support link may include a support protrusion configured to be inserted into the support groove and movably support the locking member.

The support arm may include a plurality of link frames adjacent to each other in an up-down direction, and the plurality of link frames may connect the support link and the support bracket so that the support link maintains a constant angle with respect to the support bracket.

The pivot rotation that is locked when the display module is in the second position may be a pivot rotation that rotates about a rotation axis extending in a front-rear direction of the display module, and the support device may further include a tilt link connecting the display module and the support link and rotatably coupled to the support link, the tilt link being configured to enable the display module to tilt in the front-rear direction.

The support arm may include a piston cylinder configured to reinforce support of the display module by the support arm when the display module moves between the first position and the second position.

According to one or more embodiments of the present disclosure, a display apparatus may include a support device provided to support a display module and allow the display module to pivot-rotate.

According to one or more embodiments of the present disclosure, the display apparatus may include a locking module provided to prevent the display module from pivot-rotating when the display module is in a specific position, thereby preventing the display module from colliding with a floor or the like during pivot rotation.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
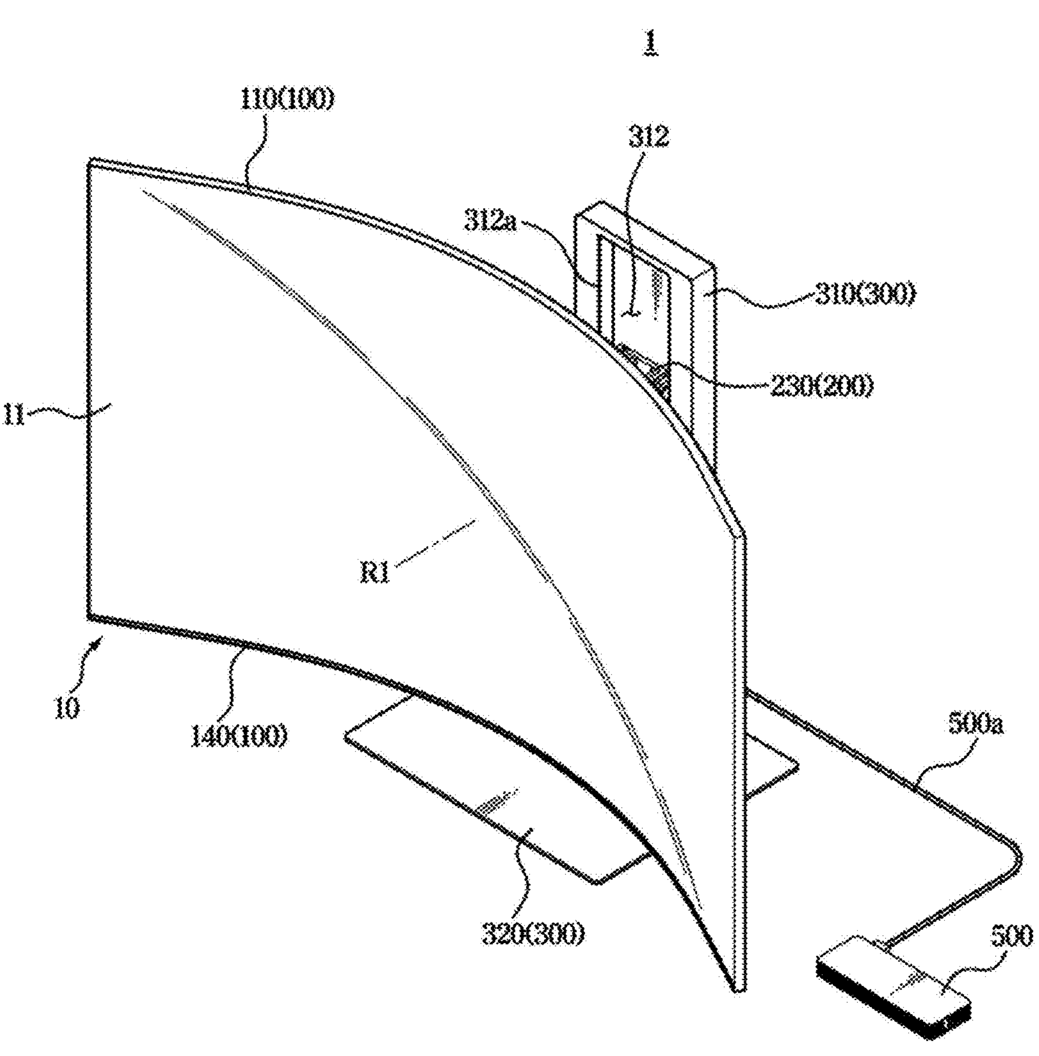
FIG. 1 is a perspective view of a display apparatus according to one or more embodiments.

The embodiments described in the disclosure and shown in the drawings are only examples, and various modifications may be made to these embodiments.

Like reference numbers or signs in the various drawings of the disclosure represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. Also, the terms "comprises," "includes," and "has" are intended to indicate that there are features, numbers, steps, operations, components, parts, or combinations thereof described in the specification, and do not exclude the presence or addition of one or more other features, numbers, steps, operations, components, parts, or combinations thereof.

It will be understood that, although the terms "first," "second," and the like may be used herein to describe various components, these components should not be limited by these terms, and the terms are only used to distinguish one component from another. For example, without departing from the scope of the present disclosure, a first component may be referred to as a second component, and similarly, the second component may also be referred to as a first component. The term "and/or" includes any combination of a plurality of related items or any one of a plurality of related items.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In this specification, the terms "front," "rear," "left," "right," and the like used in the following description are defined with reference to the drawings, and the shape and position of each component are not limited by these terms.

Hereinafter, embodiments of the present disclosure will be described in detail with reference to the accompanying drawings.

In the present disclosure, a display apparatus 1 to which a curved display module 10 is applied is described as an example, but a flat display module or a bendable or flexible display module capable of changing between a curved state and a flat state may also be applied to the display apparatus 1.

Additionally, all of these modules may be applied to the display apparatus 1 regardless of screen size. As an example, these modules may also be applied to products capable of being installed on tables, walls, ceilings, and the like, such as smart televisions and monitors, or portable products such as tablets, laptops, smart phones, and e-books.

'Front' and 'front surface' used in this specification may refer to a front surface of the display module 10, which is a side on which the display module 10 displays images, based on the display apparatus 1 illustrated in FIG. 1. Based on this, 'upper' and 'lower' may refer to upper and lower sides of the display apparatus 1 illustrated in FIG. 1, and 'both sides' and 'side' may refer to a left-right direction of the display apparatus 1 illustrated in FIG. 1.

'Pivot rotation' used in this specification may refer to a rotation in which the display module 10 rotates relative to a support device, and does not limit a direction of rotation. The pivot rotation of the display module 10 may be referred to as encompassing a rotation rotating about a rotation axis (R1 axis) extending in a front-rear direction of the display module 10, and a rotation tilting in the front-rear direction or the left-right direction.

Figure 2:
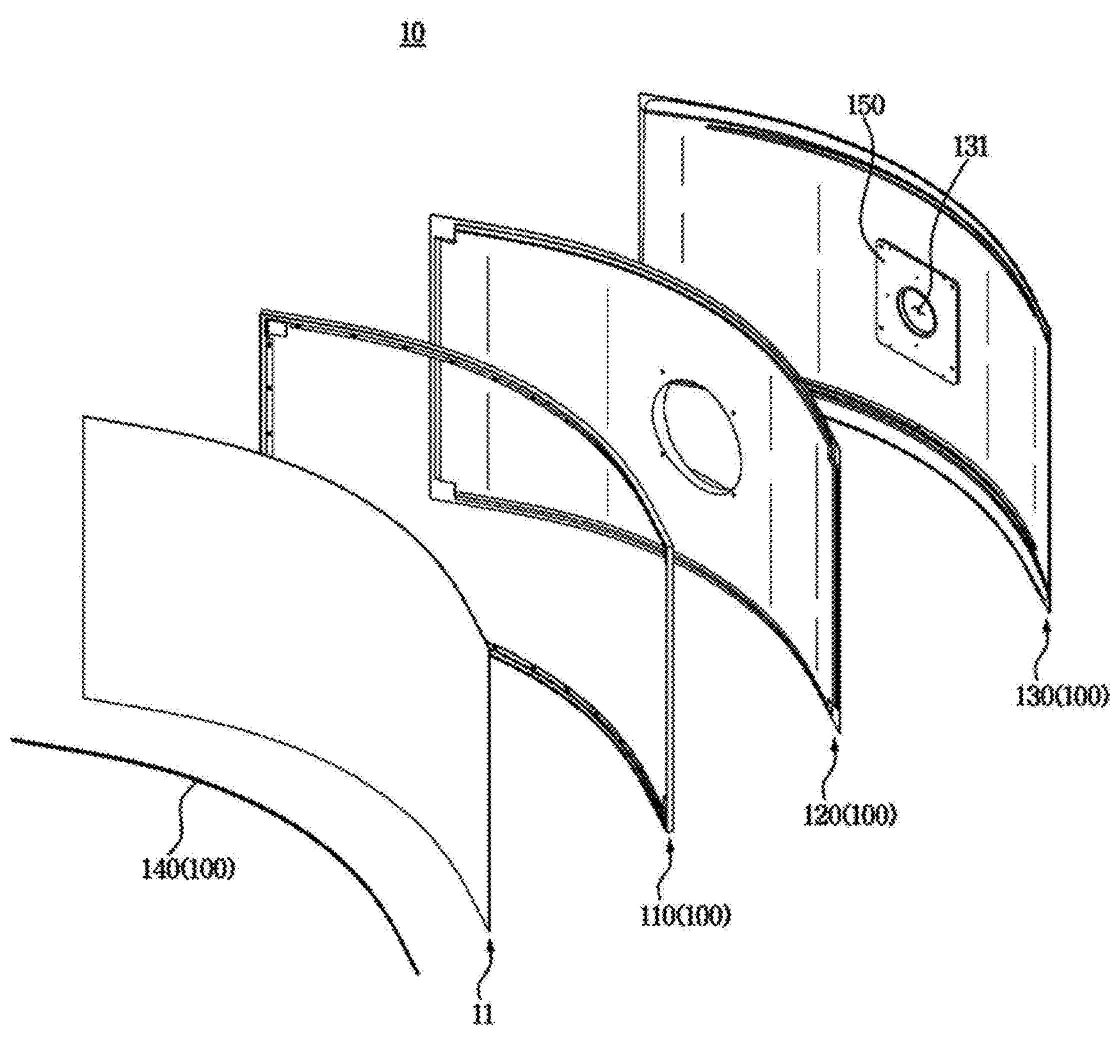
FIG. 2 is an exploded perspective view of a display module in FIG. 1 according to one or more embodiments.
Figure 3:
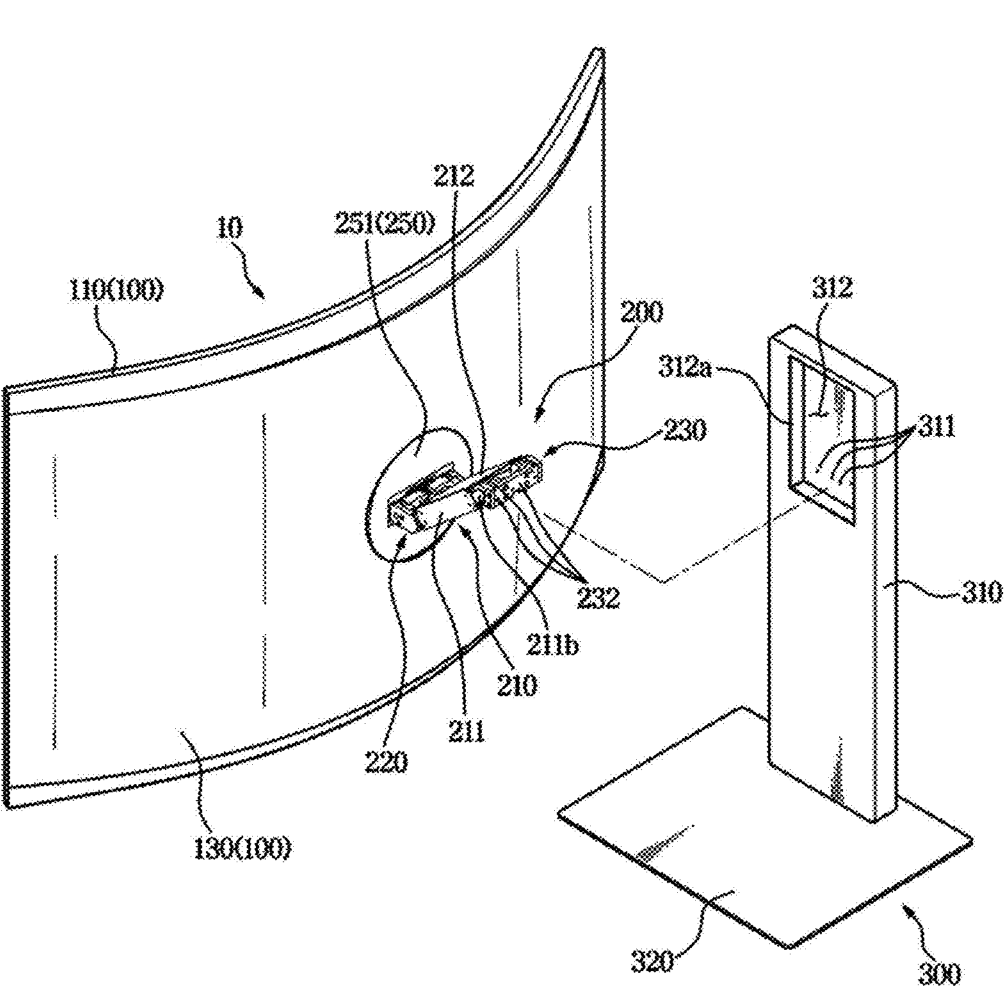
FIG. 3 illustrates a coupling relationship between the display module, a support device, and a stand in FIG. 1 according to one or more embodiments.

FIG. 1 is a perspective view of a display apparatus according to one or more embodiments. FIG. 2 is an exploded perspective view of a display module in FIG. 1 according to one or more embodiments. FIG. 3 illustrates a coupling relationship between the display module, a support device, and a stand in FIG. 1 according to one or more embodiments.

Referring to FIGS. 1, 2, and 3, the display apparatus 1 may include the display module 10 provided to display images and a support device 200 provided to support the display module 10.

The display module 10 may be configured to display images. Specifically, the display module 10 may include a display panel 11 to display images on a front surface thereof.

The display panel 11 may be a self-light emitting display panel such as organic light-emitting diodes (OLEDs), or a received-light emitting display panel such as a liquid crystal display (LCD). There is no particular limitation on the type of the display panel 11, and the display module 10 may include various types of the display panels 11.

The display module 10 may include a display case 100 provided to support the display panel 11. The display case 100 may accommodate various components of the display module 10, including the display panel 11.

The display case 100 may include a top chassis 110 provided to support front and side surfaces of the display panel 11, a bottom chassis 120 provided to support a rear surface of the display panel 11, and a rear cover 130 coupled to the rear of the bottom chassis 120 to support the rear of the display module 10.

In a case in which the display panel 11 is a received-light emitting display panel such as an LCD panel, a backlight unit (BLU) may be provided inside the display case 100. The backlight unit may be disposed at the rear of the display panel 11 to emit light toward the display panel 11.

The backlight unit may include a point light source emitting monochromatic light or white light, and may refract, reflect, and scatter the light to convert the light emitted from the point light source into uniform surface light. Specifically, the backlight unit may include a light guide plate provided to diffuse light incident from the light source, a reflective sheet provided to reflect light emitted from a rear surface of the light guide plate, and an optical sheet provided to refract and scatter light emitted from a front surface of the light guide plate.

In a case in which a backlight unit is provided in the display module 10, the bottom chassis 120 may support the backlight unit.

The display case 100 may include a middle mold disposed between the top chassis 110 and the bottom chassis 120, and the middle mold may be provided to support the backlight unit.

The display case 100 may include a front frame 140 provided to support the front surface of the display panel 11 separately from the top chassis 110. In particular, in the case of a bezel-less display apparatus in which there is no bezel portion covering the front surface of the display panel 11 on the top chassis 110, the front frame 140 may be provided that performs a function such as covering a portion of the front surface of the display panel 11. The front frame 140 may be disposed at a lower end of the display panel 11 to cover a driver connecting the display panel 11 and a printed circuit board. Because the front frame 140 performs this function, the front frame 140 may be considered as a component of the top chassis 110.

However, the display module 10 is not limited thereto this configuration and may be provided to include various configurations.

As described above, the display panel 11 may be a self-light emitting display panel such as an OLED panel, and in this case, the display module 10 may not be provided with a backlight unit. Alternatively, the display case 100 may not include a middle mold, and in this case, the display panel 11 may be supported by the top chassis 110 and the bottom chassis 120. Additionally, the display case 100 may include the top chassis 110 including a bezel portion covering at least a portion of the front surface of the display panel 11, and in this case, the display case 100 may not include the front frame 140.

The display module 10 may be provided with different horizontal and vertical side lengths. That is, the display module 10 may be provided to have a long side and a short side. The display module 10 may be provided in a rectangular plate shape.

The display module 10 may be provided in various sizes. A ratio between the long side and the short side of the display module 10 may be set at any ratio, unlike common cases such as 16:9 and 4:3.

The display module 10 may be supported by the support device 200 coupled to the rear of the display module 10. In other words, the support device 200 may support the rear of the display module 10.

The support device 200 may support the rear of the display module 10 to enable pivot rotation of the display module 10.

The support device 200 may be coupled to the rear of the display case 100 to support the display module 10. Specifically, the support device 200 may be coupled to the rear cover 130. The rear cover 130 may include a support coupling hole 131 formed to allow the support device 200 to be coupled thereto. The support coupling hole 131 of the rear cover 130 may be provided such that one end of the support device 200 passes through and is coupled thereto.

As the display module 10 is provided to enable pivot rotation about a R1 axis with respect to the support device 200, the support coupling hole 131 on the rear cover 130 may be formed to have a circular shape centered on the rotation axis of the display module 10. A support plate 250 of the support device 200, which will be described later, may also be formed to have a circular shape corresponding to the shape of the support coupling hole 131.

As the support coupling hole 131 and the support plate 250 have the corresponding shapes and are coupled to each other, a rear surface of the support plate 250 may provide an appearance of forming a rear surface of the display module 10 together with a rear surface of the rear cover 130 when a user views a rear surface of the support plate 250 from the rear. That is, the support plate 250 and the rear cover 130 may form an appearance that provides the feeling that the rear surface of the support plate 250 and the rear surface of the rear cover 130 are integrated to the user looking at the display apparatus 1 from the rear.

Figure 23:
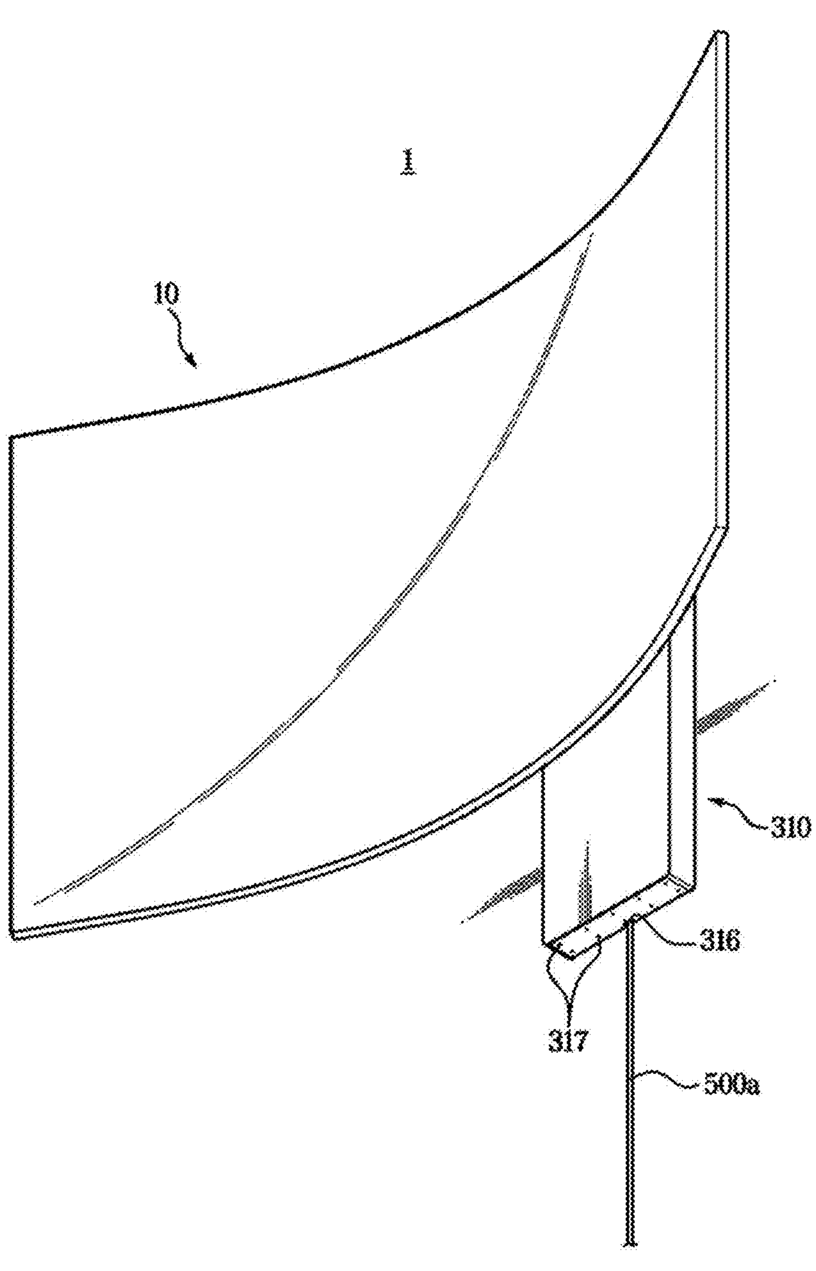
FIG. 23 illustrates that the display apparatus in FIG. 21 is mounted on a wall according to one or more embodiments.

The support device 200 may be coupled to a support object to support the display module 10. The type of support object is not limited, and refers to various objects provided such that the support device 200 may stably support the display module 10. The support object may have a fixed location or may have a movable form. The support object may be a stand body 310 coupled to a stand 300 or a stand plate 320 to be placed on the floor, as illustrated in FIG. 1, or may be the stand body 310 coupled to a wall, as illustrated in FIG. 23. Or, the support object may refer to the wall itself.

As illustrated in FIG. 1, the support device 200 may be coupled to the stand 300 to support the display module 10. Specifically, the stand 300 includes the stand body 310 and the stand plate 320, and as the stand plate 320 is placed on the floor, the display apparatus 1 may be supported by the floor.

The stand body 310 may be disposed adjacent to a rear end of the stand plate 320. Accordingly, even when the display module 10 is disposed in front of the stand body 310 and a center of gravity of the display module 10, the support device 200, and the stand body 310 points toward the front of the display apparatus 1, the display apparatus 1 may be stably supported without falling over by the stand plate 320.

The stand body 310 may be detachably coupled to the stand plate 320. The stand body 310 and the stand plate 320 may be coupled to each other in various ways. A screw fastening hole 317 (see FIG. 23) is provided at a lower end of the stand body 310, and a screw fastening hole corresponding to the screw fastening hole 317 is provided on the stand plate 320, so that the stand body 310 and the stand plate 320 may be fastened with screws. Alternatively, the stand body 310 and the stand plate 320 may be hook-coupled to each other by including a hook and a groove on which the hook is caught, respectively. Alternatively, the stand body 310 and the stand plate 320 may include a magnet to be coupled to each other by magnetism of the magnet. However, the present disclosure is not limited thereto, and the stand body 310 and the stand plate 320 do not necessarily have to be detachably coupled.

Figure 21:
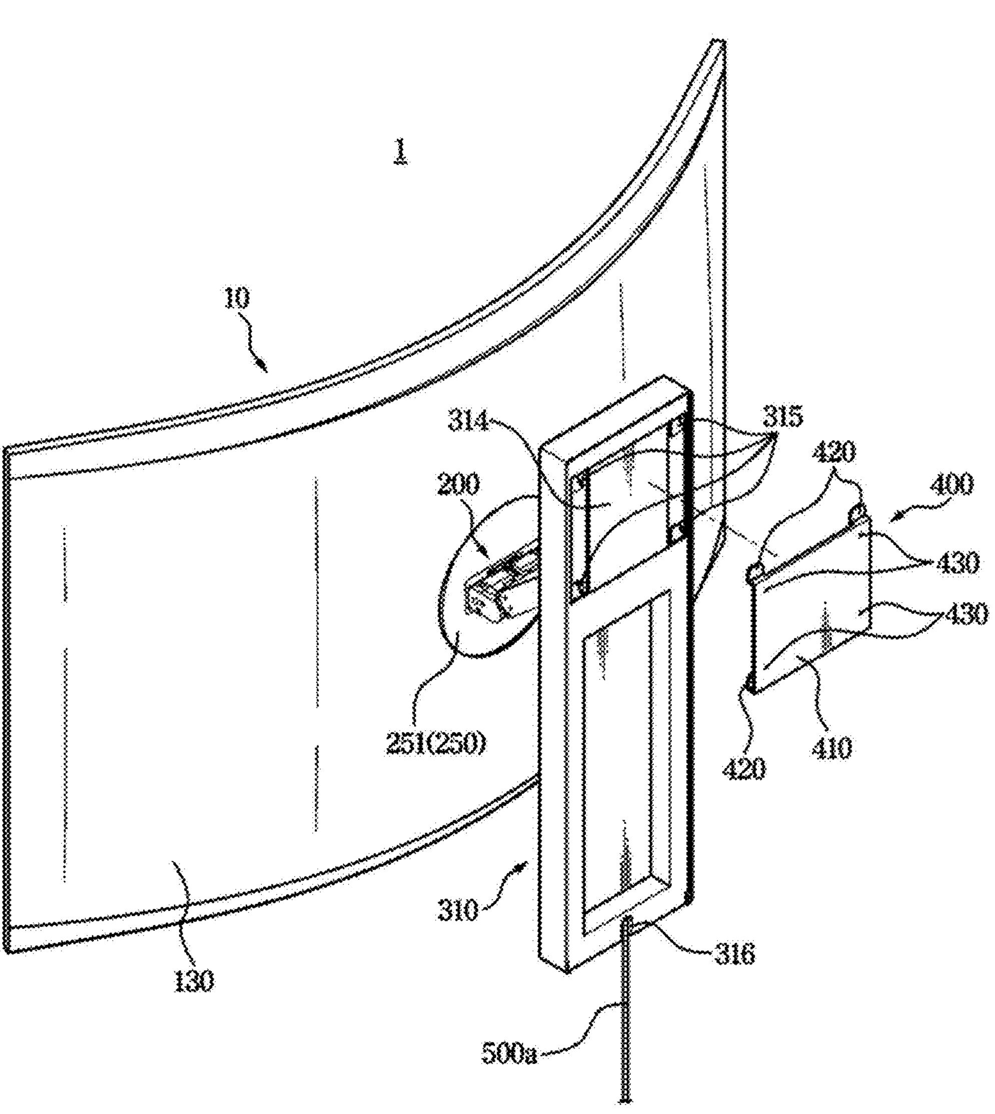
FIG. 21 illustrates a process in which the display apparatus is coupled to a wall mount bracket according to one or more embodiments.
Figure 22:
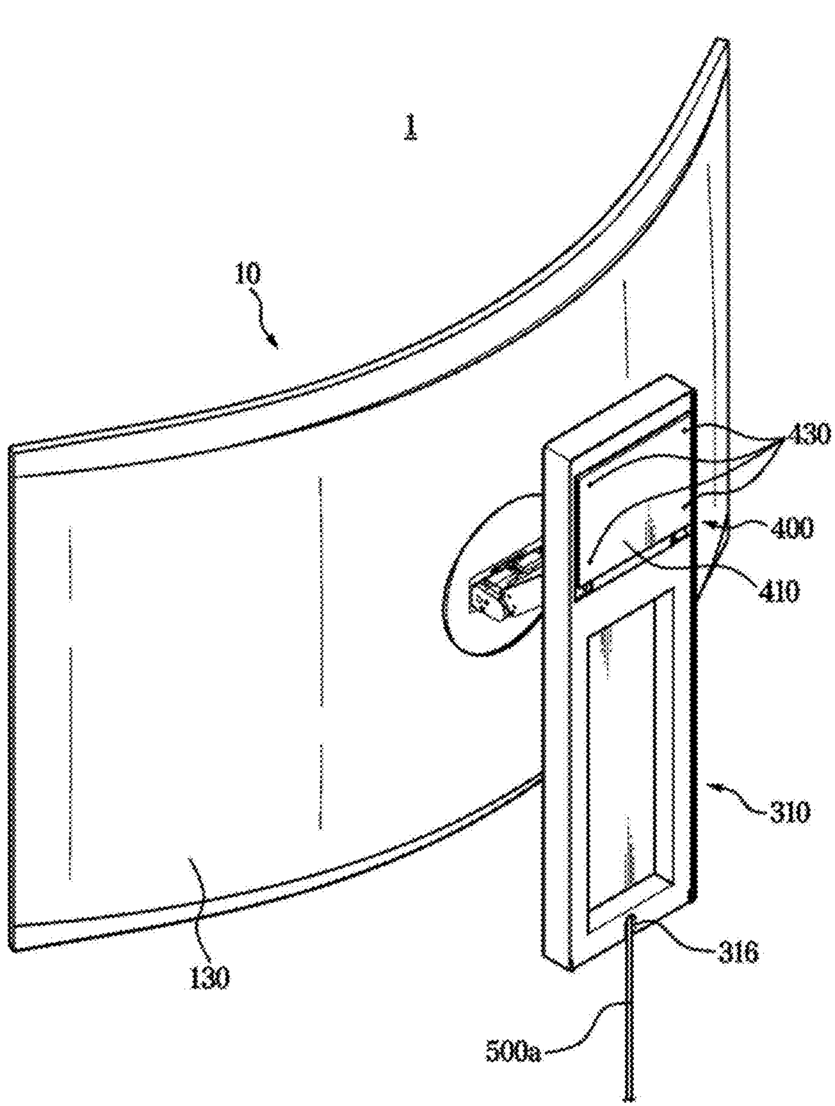
FIG. 22 illustrates a process in which the display apparatus is coupled to a wall mount bracket according to one or more embodiments.

Unlike the above description, the support device 200 may be coupled to a wall to support the display module 10. For example, as illustrated in FIGS. 21 to 23, the support device 200 may be coupled to the stand body 310 separated from the stand plate 320, and the stand body 310 may be coupled to a wall mount bracket 400 fixed to the wall. Alternatively, the support device 200 may be fixed to the wall without the stand body 310. Accordingly, the display apparatus 1 according to one or more embodiments may be a wall-mounted display apparatus. A method of coupling the support device 200 to the wall will be described later.

The stand body 310 may be formed to have an overall rectangular parallelepiped shape. In particular, the stand body 310 may be formed to have a plate shape with flat front and rear surfaces. Accordingly, the support device 200 may be easily coupled to the front surface of the stand body 310, and the stand body 310 may be more easily coupled than the case of being coupled to the wall as described above. However, the shape of the stand body 310 is not limited thereto, and may be formed in various shapes such as a cylindrical shape.

The stand body 310 may be provided with a stand fastening portion 311 to which the support device 200 is coupled on a front side facing the display module 10. Specifically, the support device 200 may include a support bracket 230 provided at one end of a side fixed to the support object such as the stand body 310, and the support bracket 230 may be fastened to the stand fastening portion 311. The support bracket 230 may be screw-fastened to the stand fastening portion 311. Accordingly, the support device 200 may be coupled to the stand body 310, and finally may be coupled to the support object such as the stand 300 or a wall.

The stand body 310 may include a support accommodating portion 312 capable of accommodating at least a portion of the support device 200. Specifically, the support accommodating portion 312 may have a concave shape from the front surface of the stand body 310 toward the rear of the stand body 310. In other words, the support accommodating portion 312 may be formed to have a frame shape with an opening 312*a* open on one side.

The stand fastening portion 311 may be disposed inside the support accommodating portion 312, and may be formed such that a front surface coupled with the support device 200 is exposed. Accordingly, the support bracket 230 may be coupled to the stand fastening portion 311 so that at least portion of the support bracket 230 is accommodated inside the support accommodating portion 312, and the stand body 310 may support the support device 200 and the display module 10 more stably. However, the present disclosure is not limited thereto, and the stand fastening portion 311 may be disposed in various ways on the stand body 310.

The support bracket 230 may be coupled to a position adjacent to a lower end portion of the support accommodating portion 312. In other words, the stand fastening portion 311 may be disposed adjacent to the lower end portion of the support accommodating portion 312. Therefore, as the support arm 200, which will be described later, rotates with respect to the stand body 310, at least a portion of a support arm 210 may be accommodated in the support accommodating portion 312.

In this case, when the support arm 210 rotates and the display module 10 is in a first position, which will be described later, a rate at which the support arm is accommodated in the support accommodating portion 312 may be maximized.

The support device 200 may include the support arm 210 rotatably coupled to the support object such as the stand body 310 so that a height of the display module 10 may be adjusted. The display module 10 may be provided to be movable between the first position (see FIGS. 5, 8, and the like) and a second position (see FIGS. 4, 6, and the like) at a lower height than the first position by the support arm 210.

FIGS. 1, 2, and 3 illustrate a state in which the display module 10 is in the second position according to one or more embodiments.

Figure 4:
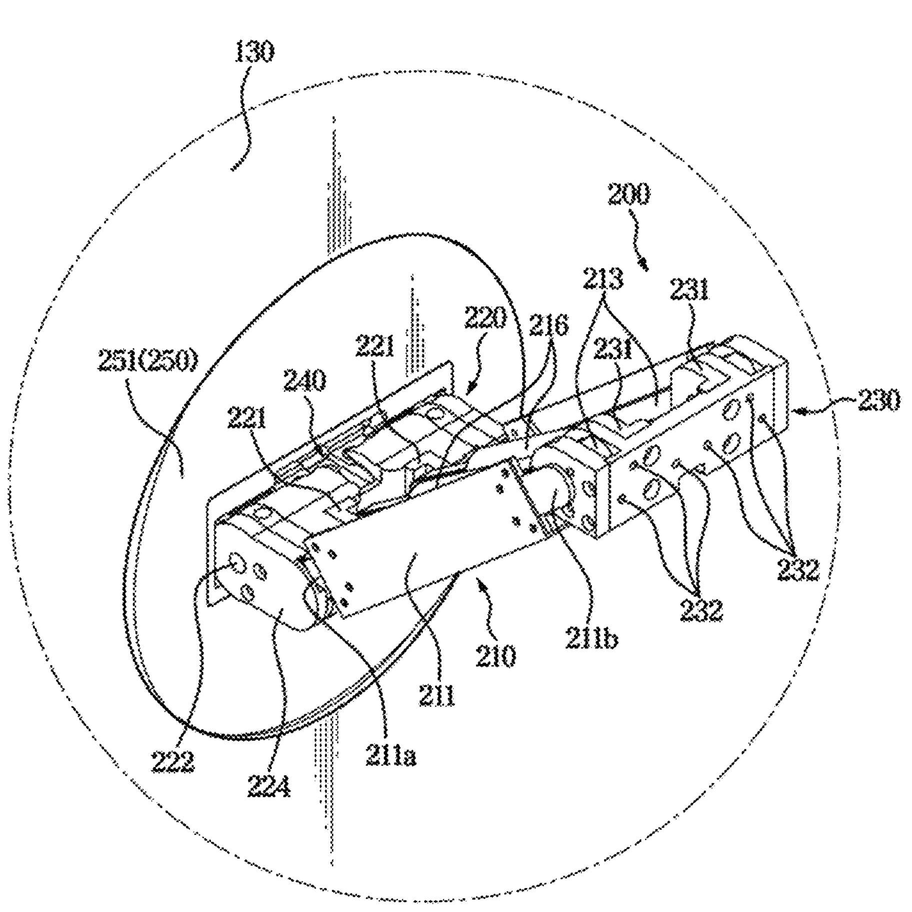
FIG. 4 illustrates the support device when the display module in FIG. 1 is in a first position according to one or more embodiments.
Figure 5:
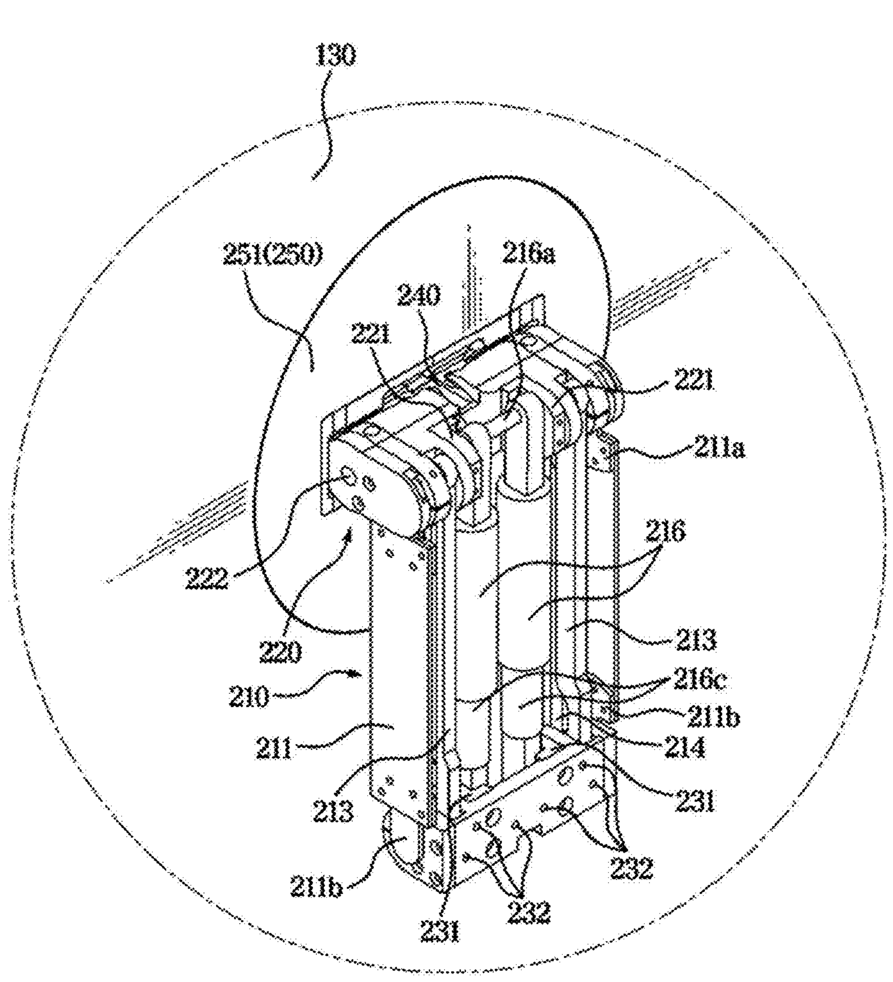
FIG. 5 illustrates the support device when the display module in FIG. 1 is in a second position according to one or more embodiments.

The first and second positions of the display module 10 are not limited to a case in which the display module 10 is at the highest and lowest heights as illustrated in FIGS. 4 and 5, and the like. The first position defined in the present disclosure, which is an arbitrary position where the display module 10 may be placed depending on the rotation of the support arm 210, refers to a position having a height at which the display module 10 may not collide with the floor even when the display module 10 pivot-rotates. Also, the second position defined in the present disclosure, which is an arbitrary position where the display module 10 may be placed depending on the rotation of the support arm 210 and that is lower than the first position, refers to an arbitrary position having a height equal to or higher than a height at which the display module 10 is likely to collide with the floor when pivot-rotates, but lower than the height of the first position.

Unlike the above, the first position and the second position may not necessarily be defined as a case in which the first position is higher than the second position. For example, in a case in which the display module 10 is provided closer to a ceiling than a floor of a room, the display module 10 may be more likely to collide with the ceiling when pivot-rotates in a high position. In this case, the first position may be defined as being lower than the second position, as will be described later, pivot-rotation locking of the display module 10 may be more necessary when the display module 10 is in the second, which is a higher position. Likewise, depending on where the display module 10 is installed, the first position and the second position may be located side by side.

According to the above definition, the first and second positions may have various locations depending on the size of the display module 10, heights of the stand 300 and the stand fastening portion 311, a length and rotation angle of the support arm 210, and the like.

However, hereinafter, for convenience of explanation, a case in which the first position of the display module 10 is higher than the second position with respect to the floor will be described.

One end of the support arm 210 may be coupled to the rear of the display module 10. Specifically, the support arm 210 may be coupled to the rear of the display case 100 by being coupled to a support link 220, which will be described later, to support the display module 10.

More specifically, the support arm 210 may be coupled to the display case 100 by a tilt link 240 rotatably coupled to the support link 220 and coupled to the support plate 250.

The support arm 210 may be rotatably coupled to the support link 220 by including a first support arm shaft 211*c* (see FIG. 6) penetrating the support link 220. Accordingly, despite the rotation of the support arm 210, the support link 220 may be provided such that the display module 10 may keep a constant angle with respect to the support object. However, the present disclosure is not limited thereto, and the support link 220 may be rotatably coupled to the support arm 210 by including a shaft penetrating the support arm 210. A specific relationship between the support arm 210 and the support link 220 will be described later.

The other end of the support arm 210 side opposite to the display module 10 may be rotatably coupled to the support bracket 230 fixed to the support object such as the stand body 310.

Specifically, the support arm 210 may be rotatably coupled to the support bracket 230 by including a second support arm shaft 211*d* (see FIG. 6) penetrating the support bracket 230. That is, the support arm 210 may rotate about the second support arm shaft 211*d*. However, the present disclosure is not limited thereto, and the support bracket 230 may include a shaft penetrating the support arm 210 such that the support arm 210 may rotate about the shaft of the support bracket 230.

The support arm 210 may be rotatably coupled to the stand body 310 by the support bracket 230, and as described above, may finally be rotatably coupled to the support object such as the stand 300 and a wall.

The support arm 210 may include a rotating body 211 provided to rotate with respect to the support bracket 230 with the second support arm shaft 211*d* as a rotation axis. The second support arm shaft 211*d* may be formed integrally with the rotating body 211. In this case, the second support arm shaft 211 may rotate with respect to the support bracket 230 together with the rotating body 211. However, the present disclosure is not limited thereto, and the second support arm shaft 211*d* may be formed separately from the rotating body 211 and may not rotate with respect to the support bracket 230.

The first support arm shaft 211*c* may be provided at the other end which is opposite to one end of the rotating body 211 on the second support arm shaft 211*d* side. In this case, the support link 220 may rotate with respect to the rotating body 211 with the first support arm shaft 211*c* as a rotation axis. The first support arm shaft 211*c* may be formed integrally with the rotating body 211 and may rotate with respect to the support link 220 together with the rotating body 211. However, the present disclosure is not limited thereto, and the first support arm shaft 211*c* may be formed separately from the rotating body 211 and may not rotate with respect to the support link 220.

The rotating body 211 may include a link coupling part 211*a* coupled to the support link 220, and the first support arm shaft 211*c* described above may be provided on the link coupling part 211*a*.

The rotating body 211 may include a bracket coupling part 211*b* coupled to the support bracket 230, and the second support arm shaft 211*d* described above may be provided on the bracket coupling part 211*b*.

The rotating body 211 may be formed to internally accommodate parts constituting the support arm 210, such as link frames 213 and 214 and a piston cylinder 216, which will be described later. In other words, the rotating body 211 covers the parts constituting the support arm 210 from the outside and may form at least a portion of an outer surface of the support arm 210.

The support arm 210 may include a support arm cover 212 covering at least one surface of the support arm 210. In other words, the support arm cover 212 may form at least a portion of the outer surface of the support arm 210. The support arm cover 212 may be coupled to the rotating body 211. The support arm cover 212 may be disposed inside the rotating body 211 to protect the parts constituting the support arm 210 and improve appearance quality.

A specific configuration of the support device 200, including the support arm 210, will be described later.

The display apparatus 1 may include a connector box 500. The connector box 500 may be connected to an external power source or various external devices to receive power or transmit and receive data. Or, the connector box 500 may be a device including a transmission/reception module so that data may be transmitted and received by the connector box itself. The connector box 500 may be connected to a connector 500*a* sequentially penetrating the stand body 310 and the support device 200 and extending to the display module 10. Accordingly, the connector box 500 may receive power from the display module 10 or exchange data with the display module 10.

Figure 20:
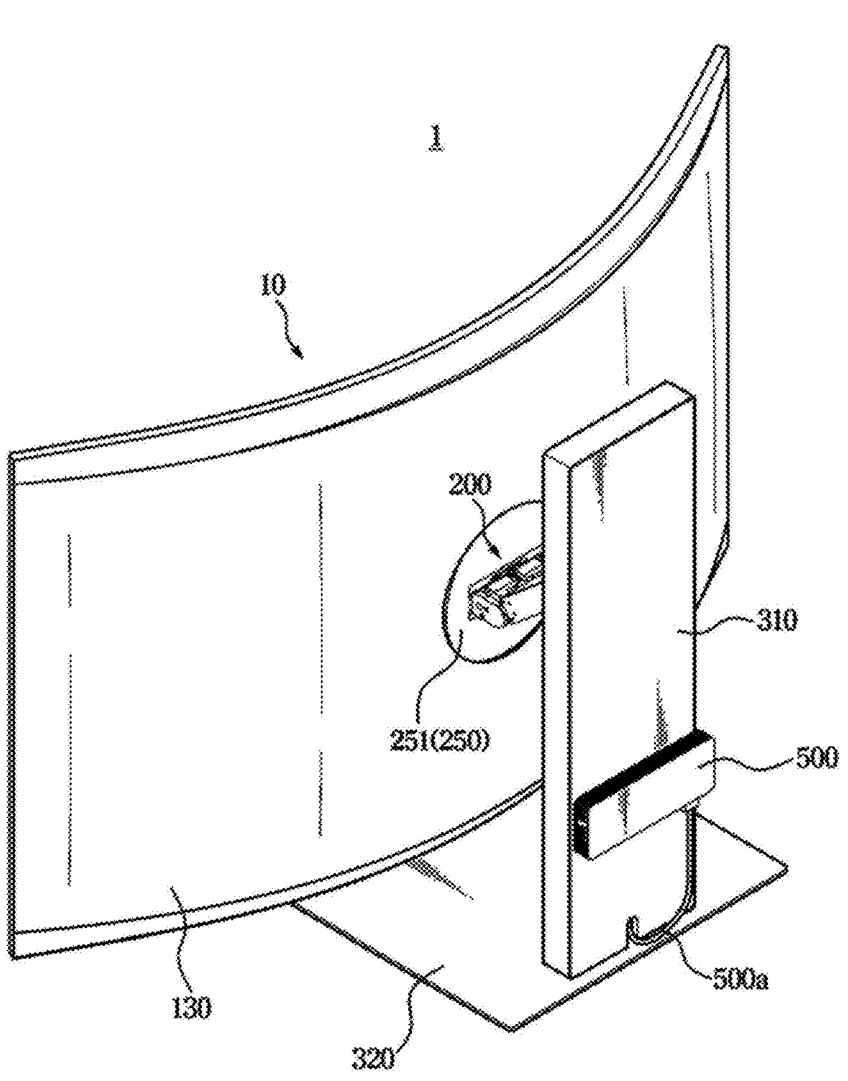
FIG. 20 illustrates that a connector box of the display apparatus is coupled to a stand according to one or more embodiments.

The connector box 500 may be disposed on the floor on which the stand 300 is placed, as illustrated in FIG. 1, and may be disposed by being attached to the stand body 310 as illustrated in FIG. 20. This will be described later.

FIG. 4 illustrates the support device when the display module in FIG. 1 is in the first position according to one or more embodiments. FIG. 5 illustrates the support device when the display module in FIG. 1 is in the second position according to one or more embodiments.

FIGS. 4 and 5 illustrate that the support arm cover 212 is separated from the support arm 210 to explain the configuration of the support device 200.

Referring to FIGS. 4 and 5, the support device 200 may include the support arm 210, the support link 220, the support bracket 230, the tilt link 240, and the support plate 250.

The support bracket 230 is configured such that the support device 200 may be fixed to the support object such as the stand body 310. Specifically, as described above, the support bracket 230 may be coupled to the stand fastening portion 311 of the stand body 310 and finally fixed to the stand 300 or a wall. The support bracket 230 may be easily fixed to the stand body 310 by including a fixing portion 232 corresponding to the stand fastening portion 311. However, the present disclosure is not limited thereto, and the support bracket 230 may be directly fixed to a wall or another support structure rather than to the stand body 310. In this case as well, it is appropriate that the support bracket 230 is provided with the fixing portion 232 to be fixed to a wall or other support structure.

As described above, the support arm 210 may be rotatably coupled to the support bracket 230. Specifically, the rotating body 211 of the support arm 210 may be coupled to the support bracket 230 by including the bracket coupling part 211*b,* and may be provided to be rotatable with respect to the support bracket 230 by including the second support arm shaft 211*d* (see FIG. 6). In addition to the rotating body 210, the link frames 213 and 214 of the support arm 210, the piston cylinder 216, and the like may also be rotatably coupled to the support bracket 230.

The first link frame 213 may be rotatably coupled to the support bracket 230 by a first link shaft 213*b* (see FIG. 6) on the support bracket 230 side.

The second link frame 214 may be rotatably coupled to the support bracket 230 by a second link shaft 214*b* (see FIG. 6) on the support bracket 230 side.

As the second support arm shaft 211*d,* the first link shaft 213*b,* and the second link shaft 214*b* provide distinct rotation axes in the support bracket 230, the support link 220 may keep a constant angle with respect to the support bracket 230. This will be described later.

The support bracket 230 may include a second cylinder coupling portion 231 to which the piston cylinder 216 is rotatably coupled. The second cylinder coupling portion 231 has a fixed position with respect to the stand body 310 and may be formed to be penetrated by the cylinder shaft 216*b* on the support bracket 230 side. The piston cylinder 216 is coupled to the second cylinder coupling portion 231 and may be rotatably coupled to the support bracket 230 by rotating about the cylinder shaft 216*b* on the support bracket 230 side.

The support link 220 may be rotatably coupled to the other end which is opposite to one end of the support arm 210 on the support bracket 230 side. Specifically, the support link 220 may be coupled to the link coupling part 211*a* of the rotating body 211, and may be rotatable with respect to the support arm 210 by the first support arm shaft 211*c* (see FIG. 6) provided in the link coupling part 211*a.*

The support link 220 may be coupled to a plurality of the link frames 213 and 214. The link frames 213 and 214 may be rotatably coupled to the support link 220.

The first link frame 213 may be rotatably coupled to the support link 220 by the first link shaft 213*a* (see FIG. 6) on the support link 220 side.

The second link frame 214 may be rotatably coupled to the support link 220 by the second link shaft 214*a* (see FIG. 6) on the support link 220 side.

As the first support arm shaft 211*c,* the first link shaft 213*a,* and the second link shaft 214*a* provide distinct rotation axes in the support link 220, the support link 220 may keep the constant angle with respect to the support bracket 230. This will be described later.

The support link 220 may include a first cylinder coupling portion 221 provided such that the piston cylinder 216 to be rotatably coupled thereto.

The first cylinder coupling portion 221 may be formed to be penetrated by a cylinder shaft 216*a* on the support link 220 side. The piston cylinder 216 is coupled to the first cylinder coupling portion 221 and may be rotatably coupled to the support link 220 by rotating about the cylinder shaft 216*a* on the support link 220 side.

The support link 220 may be formed to allow a tilt shaft 222 to pass through. Accordingly, the tilt link 240 may be coupled to the support link 220 so as to be rotatable about the tilt shaft 222 as a rotation axis. The support link 220 is disposed at the rear of the tilt link 240 and may be formed to accommodate at least a portion of the tilt link 240.

The tilt shaft 222 may penetrate the support link 220 to extend along a left-right direction of the support link 220, and accordingly, the tilt link 240 may rotate in an up-down direction with respect to the support link 220.

As the support arm 210 is rotatably coupled to the support bracket 230, the support arm 210 may be rotatably coupled to the support object such as the stand body 310. As described above, the support arm 210 may be provided such that the display module 10 is movable between the first position and the second position at a lower height than the first position.

The support arm 210 may include the rotating body 211, the plurality of link frames 213 and 214, and the piston cylinder 216. The rotating body 211 may be formed to cover the plurality of link frames 213 and 214 and the piston cylinder 216.

The plurality of link frames 213 and 214 and the piston cylinder 216 may be formed to extend along a longitudinal direction of the rotating body 211.

The rotating body 211, the plurality of link frames 213 and 214, and the piston cylinder 216 may rotate about different rotation axes. In particular, the rotating body 211, the plurality of link frames 213 and 214, and the piston cylinder 216 may be provided such that the display module 10 is movable between the first position and the second position as they rotate in the up-down direction.

The piston cylinder 216 may be coupled to the support link 220 and the support bracket 230 disposed at opposite ends of the support arm 210 by extending in a longitudinal direction of the support arm 210. In other words, the piston cylinder 216 may connect the support link 220 and the support bracket 230.

The piston cylinder 216 may include a cylinder with a space therein such that gas may be filled in a sealed state, and a piston 216*c* capable of reciprocating the inside of the cylinder. The piston 216*c* may be connected to the second cylinder coupling portion 231 as illustrated in FIGS. 4 and 5, but is not limited thereto, and may be connected to at least one of the first cylinder coupling portion 221 and the second cylinder coupling portion 231.

The piston cylinder 216 may be coupled to the first cylinder coupling portion 221 to be coupled to the support link 220. The piston cylinder 216 may be coupled to the support link 220 to be rotatable about the cylinder shaft 216*a* on the side of the support link 220 as a rotation axis. The cylinder shaft 216*a* on the support link 220 side may be disposed adjacent to an upper end of the first cylinder coupling portion 221, and one end of the piston cylinder 216 on the support link 220 side may be disposed adjacent to the upper end of the first cylinder coupling portion 221.

The piston cylinder 216 may be coupled to the second cylinder coupling portion 231 to be coupled to the support bracket 230. The piston cylinder 216 may be rotatably coupled to the support bracket 230 about the cylinder shaft 216*b* on the support bracket 230 side as a rotation axis. The cylinder shaft 216*b* on the support bracket 230 side may be disposed adjacent to a lower end of the second cylinder coupling portion 231, and one end of the piston cylinder 216 on the support bracket 230 side may be disposed adjacent to the lower end of the second cylinder coupling portion 231.

In this case, a distance between one end of the piston cylinder 216 on the support link 220 side and the other end of the piston cylinder 216 on the support bracket 230 side may be farther when the display module 10 is in the first position (FIG. 5) than when the display module 10 is in the second position (FIG. 4).

Therefore, the piston 216*c* may move inside and outside the cylinder of the piston cylinder 216 depending on the position of the display module 10, and a gas pressure inside the piston cylinder 216 may vary depending on the position of the display module 10.

With the above configuration, the piston cylinder 216 may reinforce the support of the display module 10 by the support arm 210 by changing the internal gas pressure when the display module 10 moves between the first position and the second position.

The display module 10 may be provided as a large display to provide a wide screen to viewers, and accordingly, a weight of the display module 10 may increase. In particular, in this case, since the support arm 210 includes the piston cylinder 216, it is possible for the user to more stably adjust the height of the large display module 10.

The support device 200 may include the support plate 250 provided at one end on a side opposite to the support bracket 230. As described above, the support plate 250 may pass through the support coupling hole 131 of the rear cover 130 and be coupled to the rear cover 130.

Specifically, the support plate 250 may include a first support plate 251 disposed adjacent to the support link 220, a second support plate 252 (see FIG. 10) located in front of the first support plate 251, and a third support plate 253 (see FIG. 10) located in front of the second support plate 252.

The second support plate 252 may be coupled to the tilt link 240, and the second support plate 252 may be coupled to the third support plate 253. A fixed plate 150 may be coupled to the third support plate 253 by a bearing 160. Accordingly, the display module 10 may be coupled to the support device 200 by the support plate 250 to enable the pivot rotation about the R1 axis. A specific coupling relationship of the support plate 250 will be described later.

Figure 6:
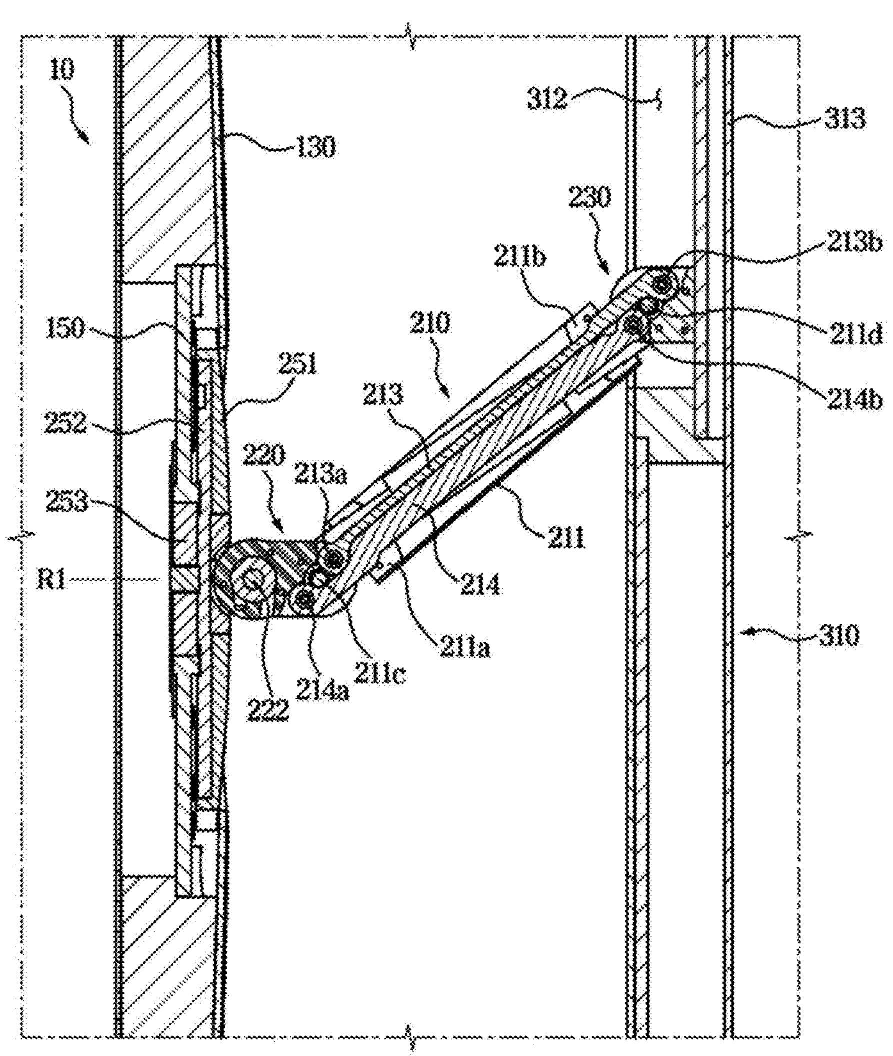
FIG. 6 illustrates operations of a plurality of link frames when the display module in FIG. 1 moves from the second position to the first position according to one or more embodiments.
Figure 7:
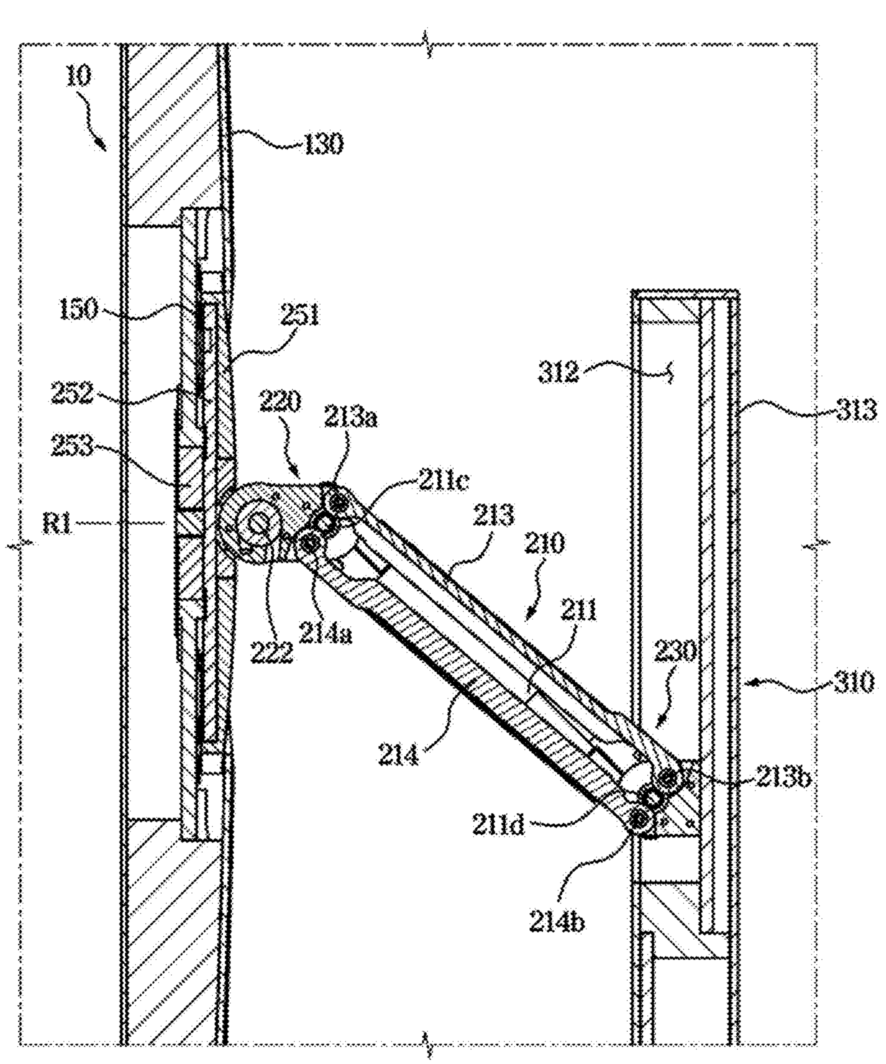
FIG. 7 illustrates operations of a plurality of link frames when the display module in FIG. 1 moves from the second position to the first position according to one or more embodiments.
Figure 8:
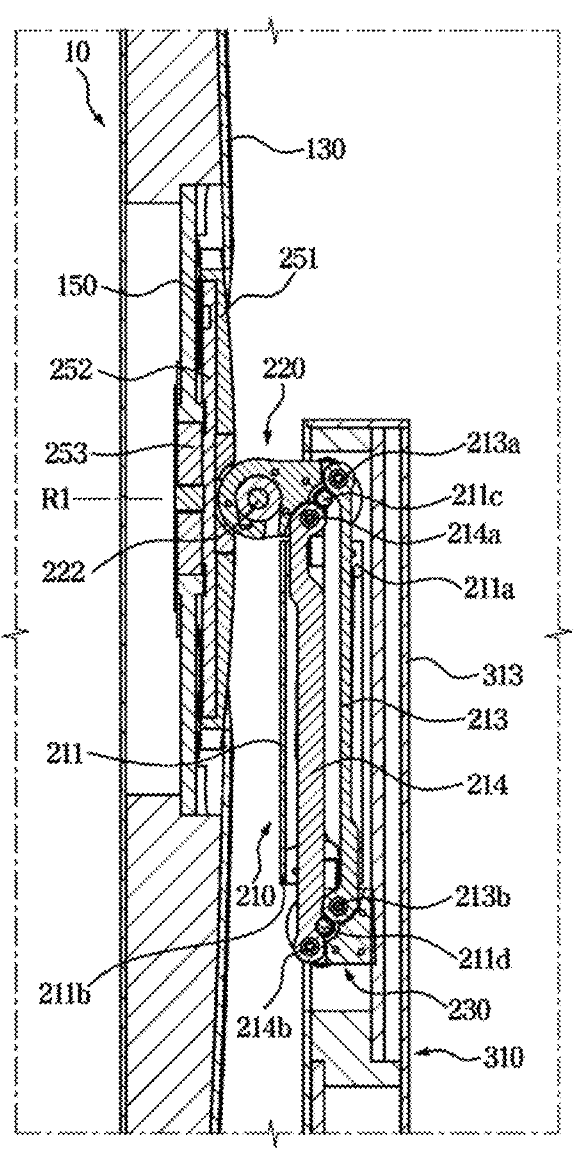
FIG. 8 illustrates operations of a plurality of link frames when the display module in FIG. 1 moves from the second position to the first position according to one or more embodiments.

FIGS. 6 through 8 illustrate operations of the plurality of link frames when the display module in FIG. 1 moves from the second position to the first position according to one or more embodiments.

In detail, FIG. 6 illustrates that the display module 10 is in the second position, FIG. 7 illustrates that the display module 10 is between the first position and the second position, and FIG. 8 illustrates that the display module 10 is in the first position.

However, as described above, the first position defined in the present disclosure is not limited to the position of the display module 10 in FIG. 8, and the second position defined in the present disclosure is not limited to the position of the display module 10 in FIG. 6.

Referring to FIGS. 6 through 8, as the support arm 210 rotates with respect to the support bracket 230, the display module 10 may move between the first position and the second position at a lower height than the first position.

The support arm 210 may include the plurality of link frames 213 and 214 adjacent to each other in the up-down direction. Specifically, the first link frame 213 may be disposed adjacent to and above the second link frame 214.

The first link frame 213 may be provided to be rotatable with respect to the support link 220 about the first link shaft 213*a* on the support link 220 side, and may be provided to be rotatable with respect to the support bracket 230 about the first link shaft 213*b* on the support bracket 230 side.

The second link frame 214 may be provided to be rotatable with respect to the support link 220 about the second link shaft 214*a* on the support link 220 side, and may be provided to be rotatable with respect to the support bracket 230 about the second link shaft 214*b* on the support bracket 230 side.

The first link shafts 213*a* and 213*b* may be disposed above with respect to the rotation axis of the rotating body 211. That is, the first link shaft 213*a* on the support link 220 side may be disposed above the first support arm shaft 211*c*, and the first link shaft 213*b* on the support bracket 230 side may be disposed above the second support arm shaft 211*d*.

Also, the first link shafts 213*a* and 213*b* may be disposed at the rear with respect to the rotation axis of the rotating body 211. That is, the first link shaft 213*a* on the support link 220 side may be disposed at the rear of the first support arm shaft 211*c*, and the first link shaft 213*b* on the support bracket 230 side may be disposed at the rear of the second support arm shaft 211*d*.

The second link shafts 214*a* and 214*b* may be disposed below with respect to the rotation axis of the rotating body 211. That is, the first link shaft 214*a* on the support link 220 side may be disposed below the first support arm shaft 211*c*, and the first link shaft 214*b* on the support bracket 230 side may be disposed below the second support arm shaft 211*d*.

Also, the first link shafts 213*a* and 213*b* may be disposed in the front with respect to the rotation axis of the rotating body 211. That is, the first link shaft 214*a* on the support link 220 side may be disposed in front of the first support arm shaft 211*c*, and the first link shaft 214*b* on the support bracket 230 side may be disposed in front of the second support arm shaft 211*d*.

According to the above arrangement, the rotating body 211, the first link frame 213, and the second link frame 214 may be provided to be rotatable about the different rotation axes.

In addition, distances between the respective rotation axes of the first link frame 213 and the second link frame 214 and the respective rotation axes of the rotating body 211 may be provided to be the same, and the first link frame 213 and the second link frame 214 may be formed to have the same length.

Accordingly, as shown in FIGS. 6, 7, and 8, even when the position of the display module 10 changes as the support arm 210 rotates, the support link 220 may keep the constant angle with respect to the support bracket 230. Furthermore, the display module 10 may be prevented from being tilted by rotation of the support arm 210, except when the tilt link 240 rotates by the plurality of link frames 213 and 214. That is, the plurality of link frames 213 and 214 may connect the support link 220 and the support bracket 230 so that the support link 220 may keep the constant angle with respect to the support bracket 230.

However, the structure of the link frames 213 and 214 and rotation axes thereof is not limited thereto, and may be formed in various ways as long as the support link 220 may keep the constant angle despite the rotation of the support arm 210.

Figure 9:
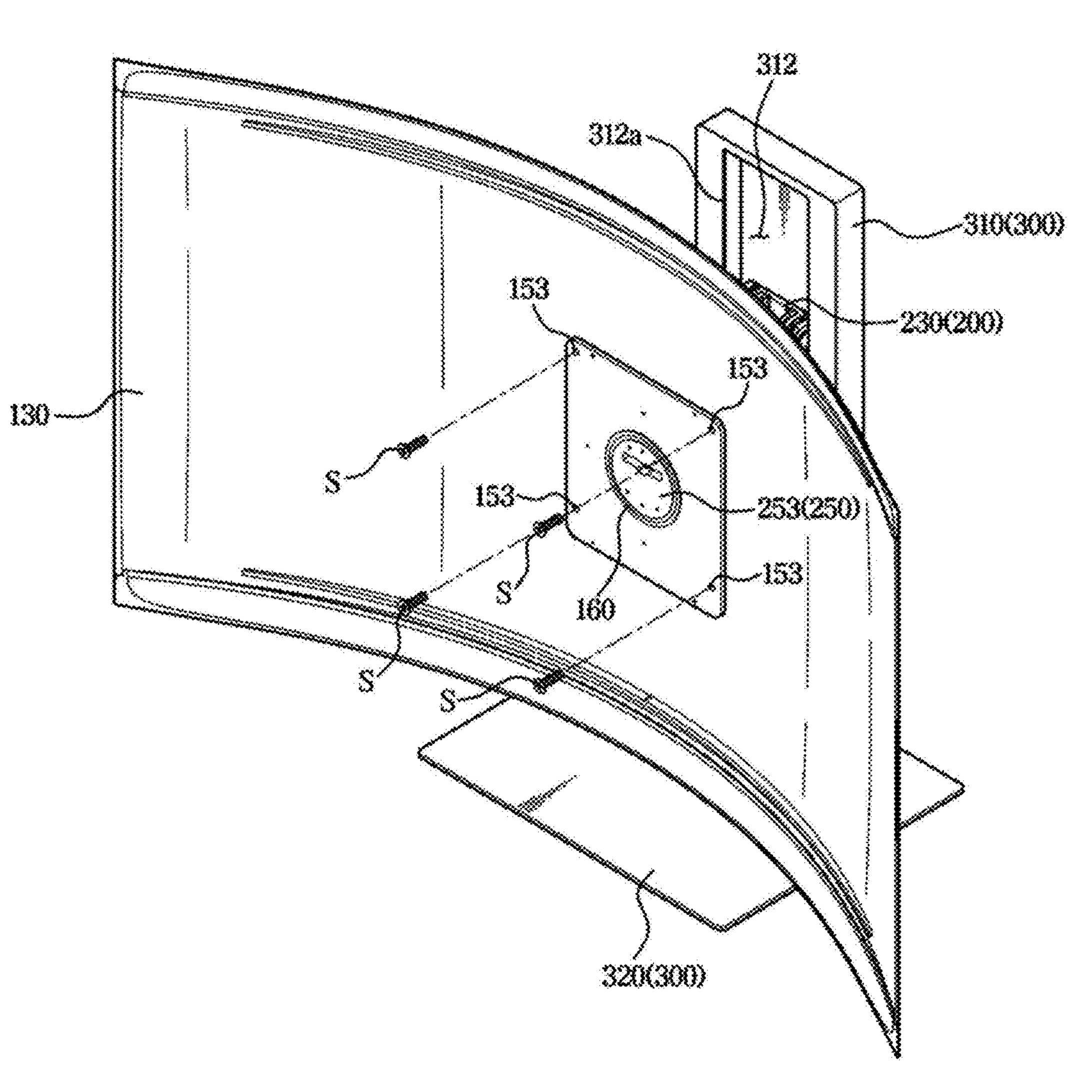
FIG. 9 illustrates a rear cover, and a fixed plate and the support device fixed to the rear cover in the display apparatus in FIG. 1 according to one or more embodiments.
Figure 10:
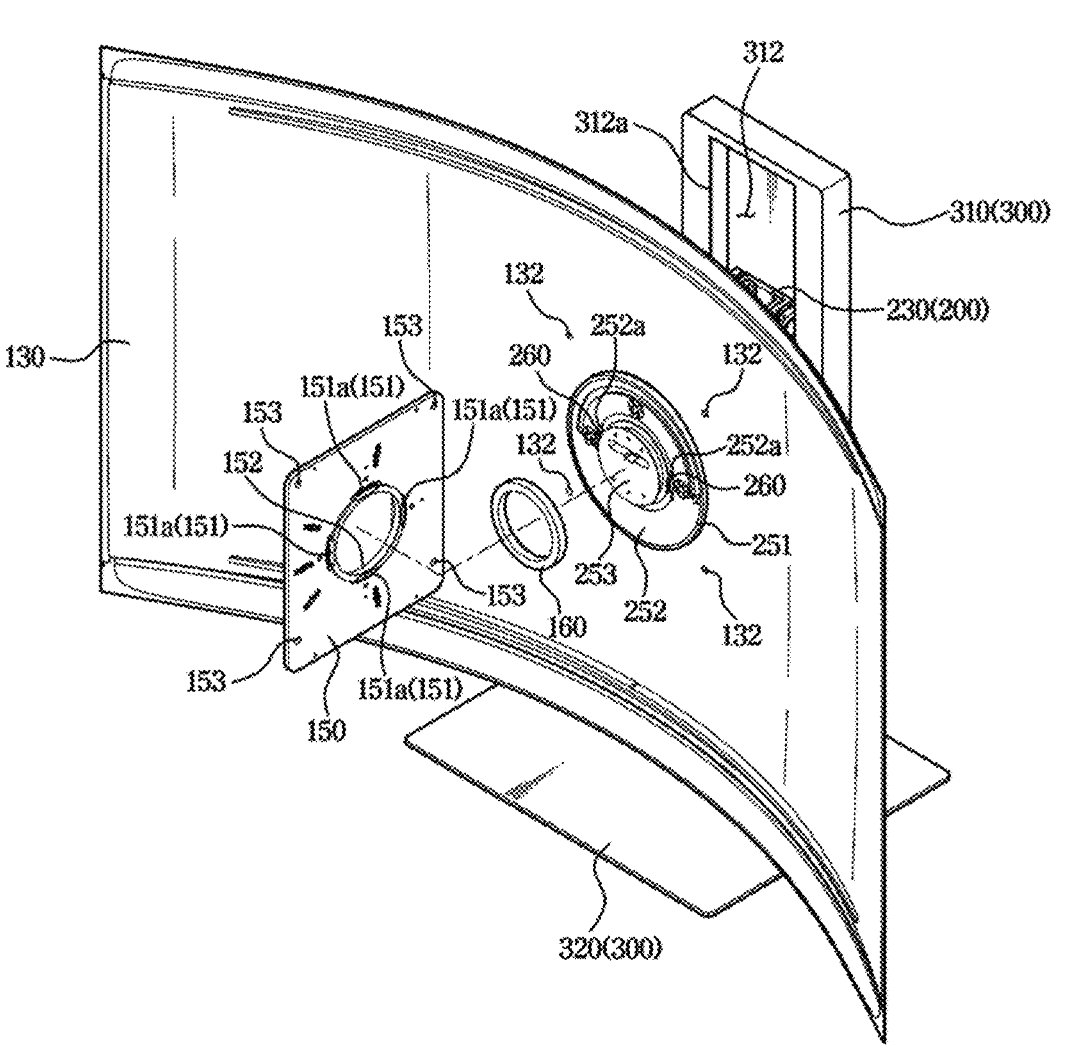
FIG. 10 illustrates that the fixed plate and a bearing are disassembled from the rear cover in FIG. 9 according to one or more embodiments.
Figure 11:
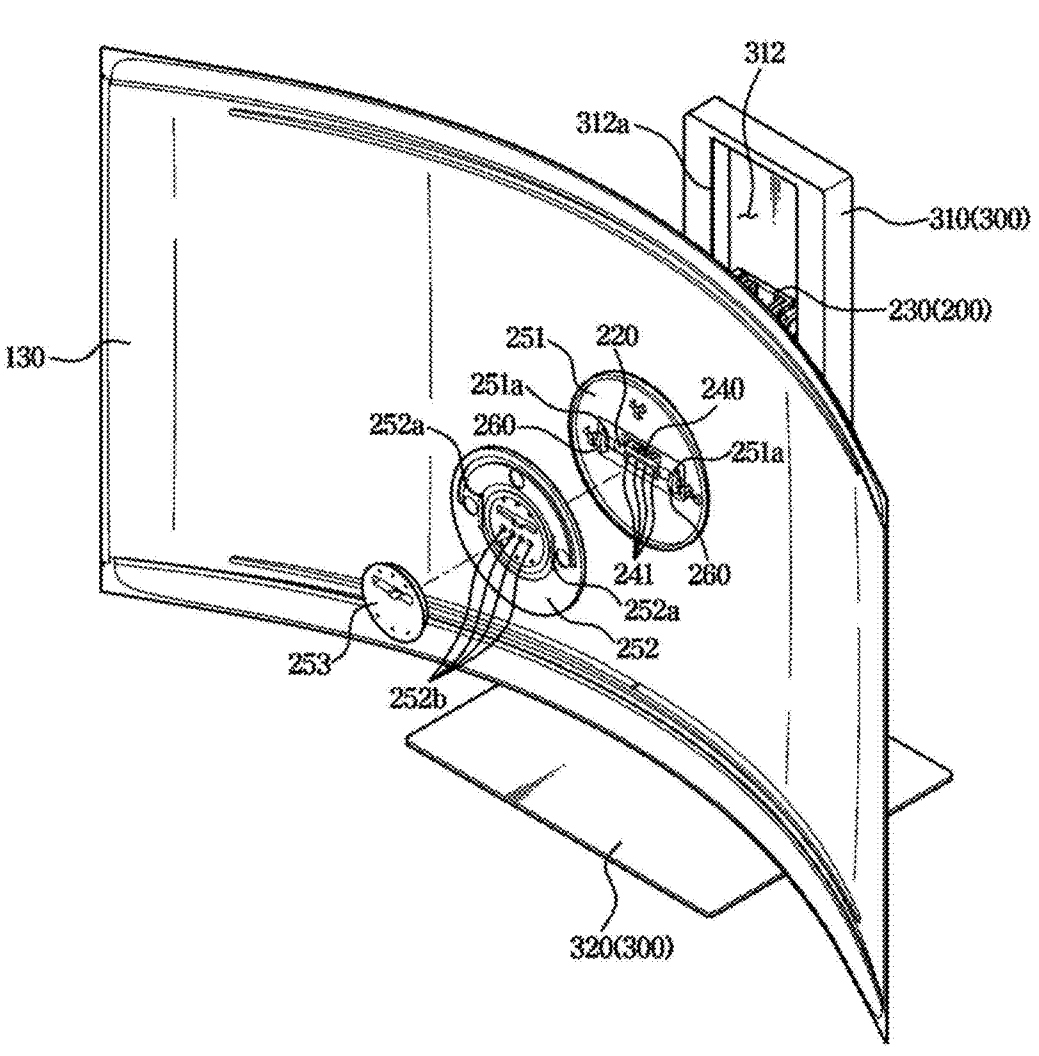
FIG. 11 is an exploded view of a support plate in FIG. 9 according to one or more embodiments.

FIG. 9 illustrates the rear cover, and the fixed plate and the support device fixed to the rear cover in the display apparatus in FIG. 1 according to one or more embodiments. FIG. 10 illustrates that the fixed plate and the bearing are disassembled from the rear cover in FIG. 9 according to one or more embodiments. FIG. 11 is an exploded view of the support plate in FIG. 9 according to one or more embodiments.

Referring to FIGS. 9, 10, and 11, the fixed plate 150 may be disposed in front of the rear cover 130. In other words, the fixed plate 150 may be fixed to the rear cover 130 inside the display case 100.

The fixed plate 150 may be fixed to the front of the rear cover 130 so as not to move with respect to the rear cover 130. Specifically, a fixed plate fastening hole 132 may be formed on the rear cover 130, and a screw hole 153 corresponding to the fixed plate fastening hole 132 may be formed on the fixed plate 150. The fixed plate 150 may be fastened to the rear cover 130 with a screw S through the screw hole 153 and the fixed plate fastening hole 132. However, the present disclosure is not limited thereto, and the fixed plate 150 may be fixed in various ways as long as the fixed plate 150 may be fixed to the display case 100. The fixed plate 150 may be fixed to one surface of the rear cover 130 by being hook-coupled. Alternatively, the fixed plate 150 may be fixed to another location of the display case 100 rather than the rear cover 130. Nevertheless, it is appropriate that the fixed plate 150 is disposed adjacent to the rear of the display module 10 so as to be adjacent to the support device 200.

Accordingly, the fixed plate 150 may be provided to rotate integrally with the display module 10 when the display module 10 pivot-rotates.

The fixed plate 150 may include a plate coupling portion 152 provided such that the support plate 250 is coupled thereto. Because the fixed plate 150 needs to be rotatable with respect to the support plate 250, the plate coupling portion 152 may be provided in a circular shape.

The plate coupling portion 152 may be formed in a circular opening shape. In this case, the fixed plate 150 may be formed such that at least a portion of the support plate 250 is exposed forward by the plate coupling portion 152 and a front surface of at least another portion of the support plate 250 is covered by another portion of the fixed plate 150. The at least a portion of the support plate 250 exposed forward by the plate coupling portion 152 may be the third support plate 253. In this case, the connector **500*a* penetrating the stand body 310 may extend to the inside of the display module 10 by passing the support arm 210 and sequentially passing through the support plate 250 and the plate coupling portion 152 having an opening shape. However, the present disclosure is not limited thereto, the plate coupling portion 152 may have various shapes, and the connector 500*a* may also be connected to the inside of the display module 10** in other ways.

The bearing 160 may be disposed between the support plate 253 and the fixed plate 150 so that the fixed plate 150 is coupled to be rotatable with respect to the support plate 253. Specifically, the bearing 160 may be disposed on the plate coupling portion 152 to rotatably couple the support plate 253 and the fixed plate 150 to each other. In particular, the bearing 160 may be disposed between the fixed plate 150 and the third support plate 253. However, the present disclosure is not limited thereto, and the support plate 253 and the fixed plate 150 may be coupled in various ways as long as the support plate 253 and the fixed plate 150 may be rotatably coupled to each other.

The bearing 160 may be provided to surround an outer circumference of the third support plate 253. In this case, at least a portion of a front surface of the bearing 160 may be covered by an outer circumference portion of the third support plate 253. In other words, the front of the bearing 160 may be covered by the outer circumference portion of the third support plate 253, and the rear of the bearing 160 may be covered by the second support plate 252. Accordingly, the bearing 160 may be fixed so as not to move in the front-rear direction by the second support plate 252 and the third support plate 253.

As described above, in a case in which the plate coupling portion 152 has a circular opening shape, the bearing 160 may be disposed along an inner circumference of the plate coupling portion 152. In other words, in the case in which the plate coupling portion 152 has a circular opening shape, the plate coupling portion 152 may cover an outer circumferential surface of the bearing 160.

FIG. 10 illustrates the bearing 160 as being coupled from the front of the third support plate 253, but this is merely to explain a relationship in which the fixed plate 150 and the support plate 250 are rotatably coupled by the bearing 160 for convenience. The arrangement of bearing 160 is not limited to that described above and illustrated in FIGS. 9 to 11.

The display case 100 may include a locking portion 151 formed to allow a locking member 260, which will be described later, to be inserted therein. The locking portion 151 may be provided at the rear of the display case 100 and may be provided such that the locking member 260 is inserted therein when the display module 10 is in the second position.

Specifically, the locking portion 151 may be formed on the fixed plate 150. As the fixed plate 150 is fixed to the front of the rear cover 130, the locking portion 151 may be formed on a rear surface of the fixed plate 150 facing the rear cover 130. However, the locking portion 151 is not limited thereto, and may be disposed in various positions such as a side surface of the fixed plate 150 as long as the locking member 260 is provided to be inserted therein. This is the same even when the fixed plate 150 is fixed to the front of the rear cover 130.

As the fixed plate 150 is fixed to the rear cover 130, when the locking member 260 is inserted into the locking portion 151, the pivot rotation of the entire display module 10 may be locked.

However, in a case in which the locking portion 151 is provided in another location on the display case 100 rather than on the fixed plate 150, even though there is no fixed plate 150, the pivot rotation of the display module 10 may be locked as the locking member 260 is inserted into the locking portion 151. For example, the locking portion 151 may be provided on the rear cover 130.

As described above, in the case in which the plate coupling portion 152 has a circular opening shape and the bearing is disposed inside the plate coupling portion 152, the locking portion 151 may be provided on an outer side of the plate coupling portion 152 in a radial direction with respect to the plate coupling portion 152 and the bearing 160.

The locking portion 151 may include a locking groove 151*a* concavely formed to allow the locking member 260 to be inserted therein. Specifically, the locking groove 151*a* may be formed to have a concavely recess shape in a direction in which the locking member 260 is inserted so that the locking member 260 is inserted into the locking groove 151*a* when the display module 10 is in the second position. As illustrated in FIG. 10, the locking groove 151*a* may be formed concavely forward on the rear surface of the fixed plate 150. However, the locking portion 151 is not limited thereto and may have various shapes into which the locking member 260 may be inserted. For example, the locking portion 151 may be formed in the shape of a hole penetrating the fixed plate 150.

As illustrated in FIGS. 10 and 11, a plurality of the locking members 260 may be formed. Therefore, a plurality of the locking portions 151 may also be formed. However, because the locking portion 151 may be rotated with respect to the locking member 260 to change a position thereof when the display module 10 pivot-rotates, the number of the locking portions 151 may be provided to be greater than the number of the locking members 260.

In general, when the display module 10 pivot-rotates about the R1 axis, the user will arrange the display module 10 such that the long side of the display module 10 is parallel to the ground (landscape orientation), or will arrange the display module 10 such that the long side of the display module 10 is perpendicular to the ground (portrait orientation). Therefore, it is sufficient that the locking portion 151 is formed such that the pivot rotation about the R1 axis is locked only when the display module 10 has the above two arrangements. However, the present disclosure is not limited thereto, and the number of the locking portions 151 may be provided differently from those described above. It is sufficient that the number of the locking portions 151 is greater than or equal to the number of the locking members 260 so that the locking members 260 may be inserted into the locking portions 151.

The locking portion 151 may be formed to extend longer in a tilt-rotation direction than the locking member 260 to facilitate the tilt rotation of the display module 10 in the front-rear direction even when the locking member 260 is in a state of being inserted into the locking portion 151. For example, the locking portion 151 into which the locking member 260 is inserted may be formed to extend long in a direction parallel to the short side of the display module 10 when the long side of the display module 10 is parallel to the ground. On the other hand, the locking portion 151 into which the locking member 260 is inserted may be formed to extend long in a direction parallel to the long side when the long side of the display module 10 is perpendicular to the ground.

However, the present disclosure is not limited thereto, and the locking portion 151 may be formed to have various shapes as long as the locking member 260 may be inserted therein. For example, the locking portion 151 may be formed to have a size substantially the same as that of the locking member 260 to prevent a movement within the locking portion 151 when the locking member 260 is inserted therein.

Depending on a shape of the locking portion 151, when the locking member 260 is inserted into the locking portion 151, the pivot rotation of the display module 10 about a plurality of rotation axes, such as the tilt rotation in the front-rear direction as well as the pivot rotation about the R1 axis, may be locked. Furthermore, the pivot rotation of the display module 10 in all directions may be locked.

The support plate 250 may be rotatably coupled to the rear of the display case 100. In other words, the display case 100 may be coupled to the support plate 250 to enable pivot-rotation about the R1 axis. The configuration in which the display case 100 and the display module 10 pivot-rotate about the R1 axis with respect to the support plate 250 has been described above.

The support plate 250 may include the first support plate 251 disposed adjacent to the support arm 210 and the support link 220, the second support plate 252 disposed in front of the first support plate 251, and the third support plate 253 disposed in front of the second support plate.

The first support plate 251 may be formed such that the support link 220 and the tilt link 240 are mounted thereon. The first support plate 251 may be formed such that at least a plate coupling portion 241 of the tilt link 240 is exposed to be coupled to a link coupling portion 252*b* of the second support plate 252. However, the present disclosure is not limited thereto, the tilt link 240 may be coupled to another configuration of the support plate 250 rather than to the second support plate 252, and in this case, the first support plate 251 may be formed differently from that illustrated in FIG. 11. Or, in a case in which the support device 200 does not include the tilt link 240, the support link 220 may be coupled to the support plate 250, and in this case as well, the first support plate 251 may be formed differently from that illustrated in FIG. 11.

The second support plate 252 may be disposed between the first support plate 251 and the third support plate 253, and may be coupled to the third support plate 253 at the front thereof and coupled to the tilt link 240 at the rear thereof. The second support plate 252 may be screw-coupled to the plate coupling portion 241 of the tilt link 240 by including the link coupling portion 252*b*. However, the present disclosure is not limited thereto, and the second support plate 252 and the tilt link 240 may be coupled in various ways.

Because the tilt link 240 is coupled to the second support plate 252 located in front of the first support plate 251 in a state of being mounted on the rear of the first support plate 251, the first support plate 251 and the second support plate 252 may be coupled to each other.

According to the above configuration, the first support plate 251, the second support plate 252, and the third support plate 253 may be fixed to each other to form the support plate 250. However, the present disclosure is not limited thereto, and the support plate 250 may have various configurations to be fixed to the tilt link 240 and the support link 220 to be coupled to the display case 100 and to enable the pivot rotation of the display module 10.

The support plate 250 may be fixed to the tilt link 240 so as not to rotate with respect to the tilt link 240. In this case, the support plate 250 may be provided in a disk shape to be coupled in a direction perpendicular to the plate coupling portion 241 of the tilt link 240.

Figure 12:
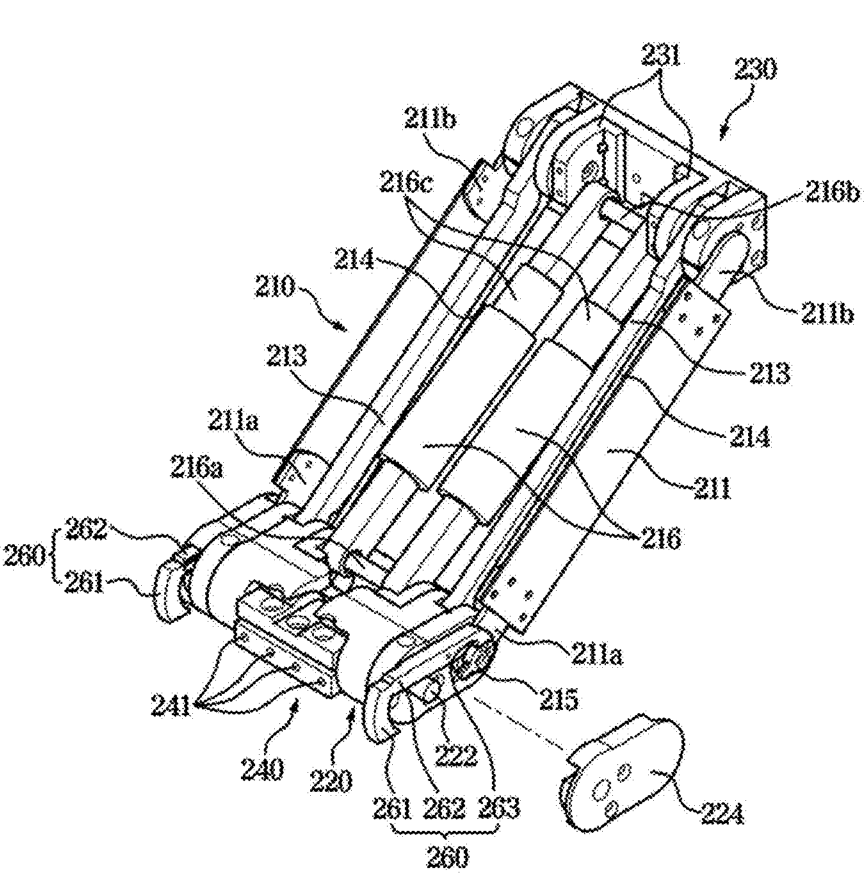
FIG. 12 illustrates a locking member according to one or more embodiments.

Referring to FIG. 12, the tilt link 240 may be coupled to the support link 220 by the tilt shaft 222 penetrating the support link 220. That is, the tilt link 240 may be provided to be rotatable with respect to the support link 220 about the tilt shaft 222. As described above, the tilt shaft 222 is provided to penetrate the support link 220 in the left-right direction, so that the tilt link 240 may rotate in the up-down direction with respect to the support link 220.

Therefore, when the tilt link 240 rotates in the up-down direction with respect to the support link 220, the support plate 250 may also tilt-rotate in the front-rear direction.

The support plate 250 is coupled to the fixed plate 150 by the bearing 160, which only allows the fixed plate 150 to pivot-rotate about the R1 axis with respect to the support plate 250, and may not allow the fixed plate 150 to rotate in other directions with respect to the support plate 250. Accordingly, when the support plate 250 tilt-rotates in the front-rear direction, the fixed plate 150 may also tilt-rotate in the front-rear direction together with the support plate 250, and finally, the entire display module 10 may tilt-rotate in the front-rear direction. With this configuration, the user may easily adjust a tilt of the display module 10 in the front-rear direction.

The support plate 250 may include passing holes 251*a* and 252*a*, which will be described later, formed to allow the locking member 260 to pass through.

Specifically, the passing holes 251*a* and 252*a* may be formed such that the locking member 260 may pass through the support plate 250 from the rear to the front and be inserted into the locking portion 151 described above. In other words, the passing holes 251*a* and 252*a* may be formed at positions corresponding to the locking member 260 and the locking portion 151.

The passing holes 251*a* and 252*a* may include the first passing hole 251*a* formed on the first support plate 251 and the second passing hole 252*a* formed on the second support plate 252. The first passing hole 251*a* and the second passing hole 252*a* may be formed parallel to each other in the front-rear direction.

The passing holes 251*a* and 252*a* may be formed longer in the up-down direction than the locking member 260 so that the display module 10 may easily tilt-rotate in the front-rear direction even in a state in which the locking member 260 passes therethrough.

However, the present disclosure is not limited thereto, and the passing holes 251*a* and 252*a* of the support plate 250 may be formed in various ways as long as the locking member 260 may pass therethrough. For example, depending on the shapes of the fixed plate 150 and the third support plate 253, a passing hole through which the locking member 260 passes may be provided on the third support plate 253.

FIGS. 10 and 11 illustrated that, as in the case of the display apparatus 1 of FIG. 1, the display module 10 is in the second position, and thus the locking member 260 is advanced so that the locking member 260 may be inserted into the locking portion 151. In contrast, when the display module 10 is in the first position, the locking member 260 may be located further rear than the locking member 260 shown in FIGS. 10 and 11.

A specific configuration and operation of the locking member 260 will be described below.

Figure 13:
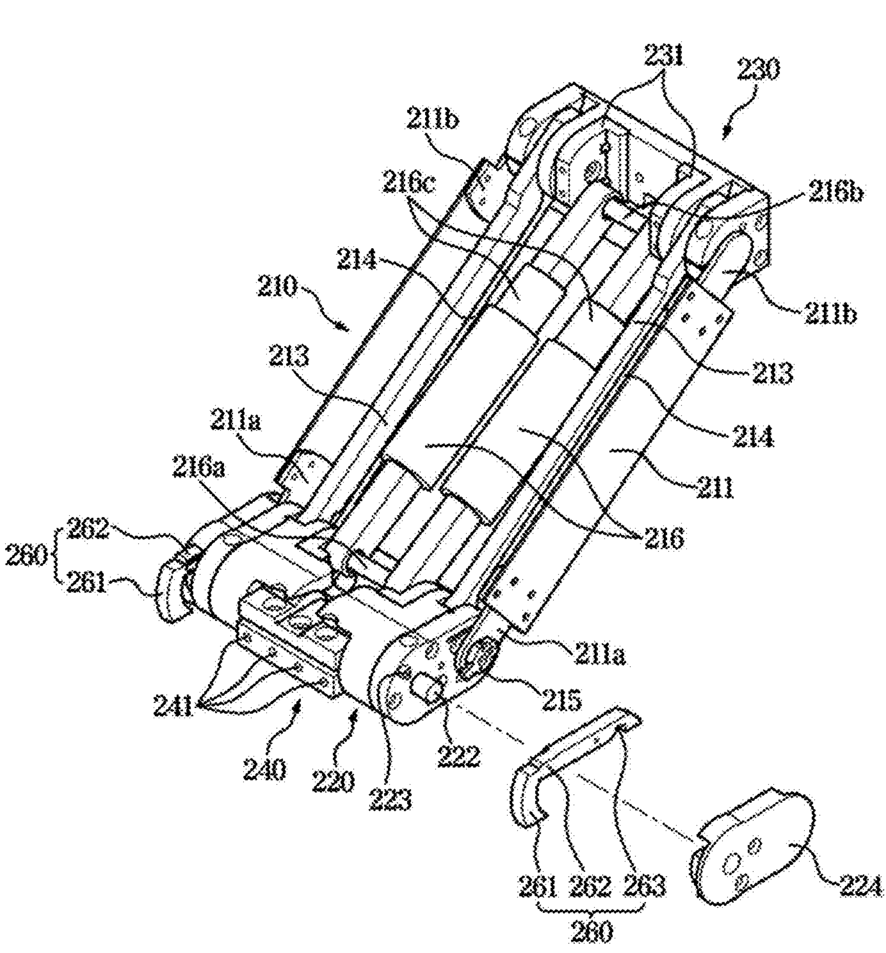
FIG. 13 illustrates the locking member disassembled from a support link in FIG. 12 according to one or more embodiments.
Figure 14:
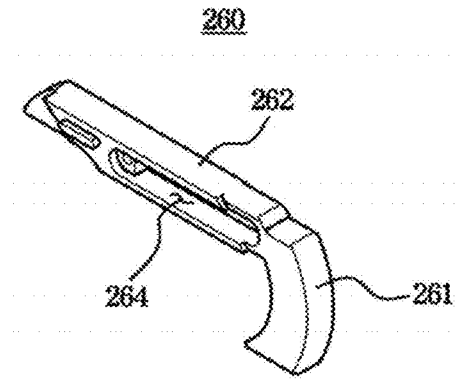
FIG. 14 illustrates the locking member in FIG. 12 viewed from another direction according to one or more embodiments.
Figure 15:
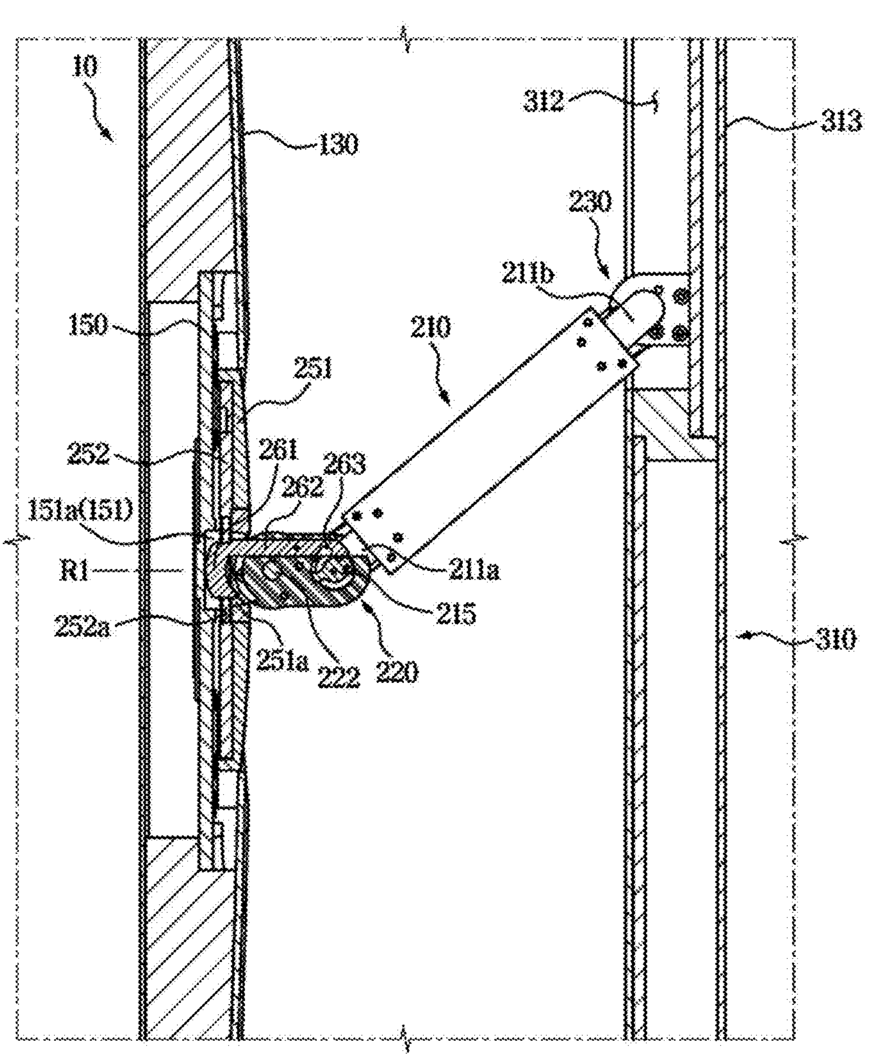
FIG. 15 is cross-sectional view illustrating operations of the locking member when the display module moves from the second position to the first position in the display apparatus according to one or more embodiments.
Figure 16:
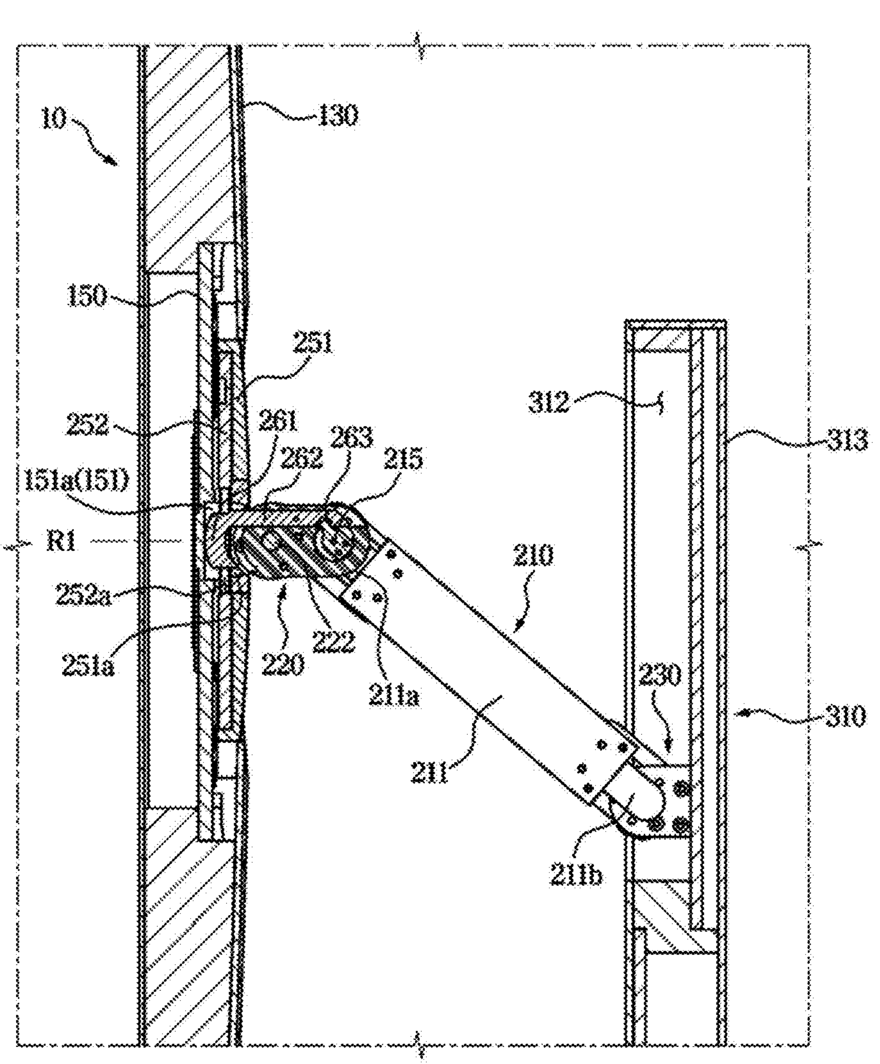
FIG. 16 is a cross-sectional view illustrating operations of the locking member when the display module moves from the second position to the first position in the display apparatus according to one or more embodiments.
Figure 17:
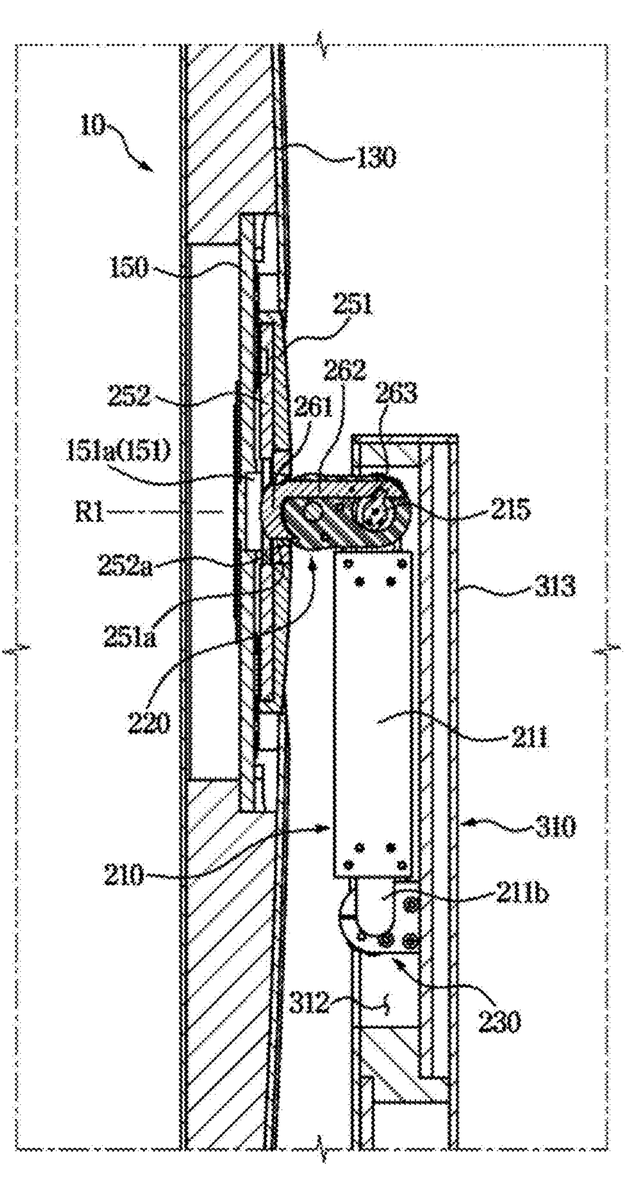
FIG. 17 is a cross-sectional view illustrating operations of the locking member when the display module moves from the second position to the first position in the display apparatus according to one or more embodiments.
Figure 18:
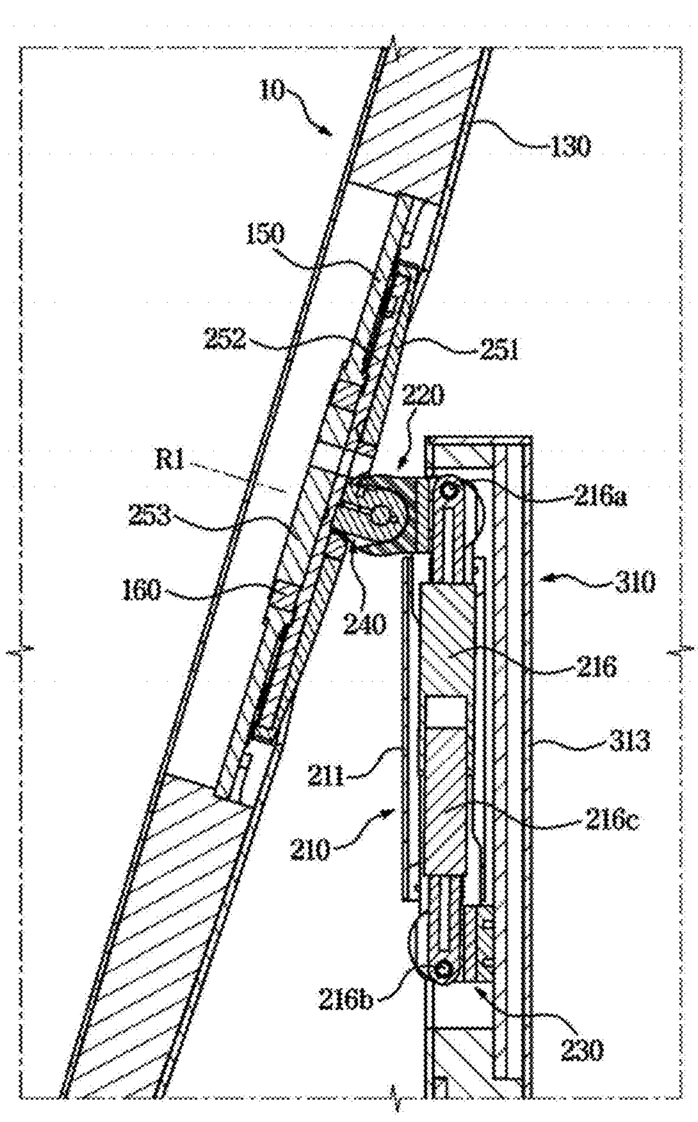
FIG. 18 is a cross-sectional view illustrating that the display module tilt-rotates in a front-rear direction according to one or more embodiments.
Figure 19:
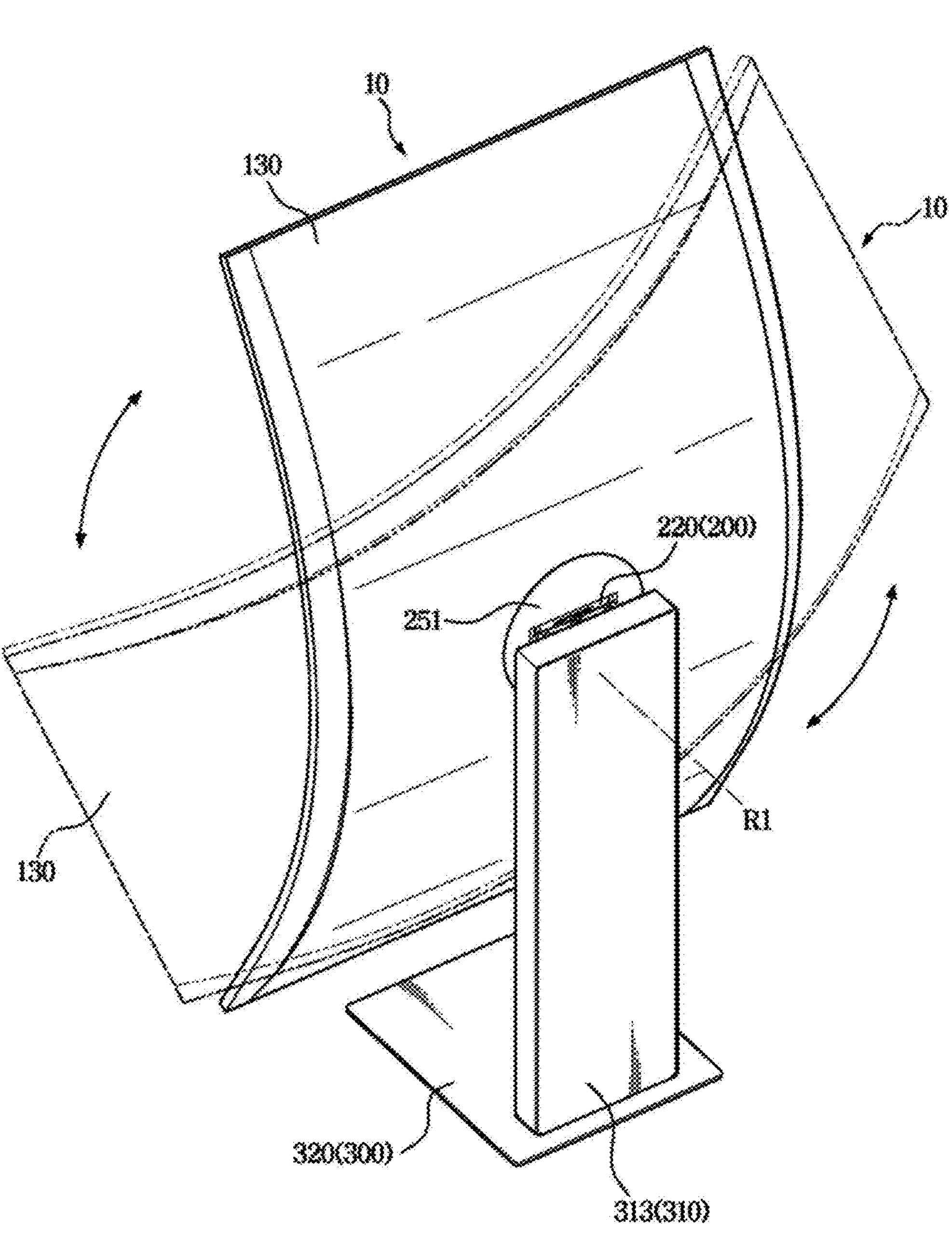
FIG. 19 illustrates that the display module pivot-rotates about a rotation axis directing to the front from the rear of the display module according to one or more embodiments.

FIG. 12 illustrates the locking member according to one or more embodiments. FIG. 13 illustrates the locking member disassembled from the support link in FIG. 12 according to one or more embodiments. FIG. 14 illustrates the locking member in FIG. 12 viewed from another direction according to one or more embodiments. FIGS. 15, 16 and 17 are cross-sectional views illustrating operations of the locking member when the display module moves from the second position to the first position in the display apparatus according to one or more embodiments. FIG. 18 is a cross-sectional view illustrating that the display module tilt-rotates in the front-rear direction according to one or more embodiments. FIG. 19 illustrates that the display module pivot-rotates about a rotation axis directing to the front from the rear of the display module according to one or more embodiments.

Referring to FIGS. 12 through 19, the support device 200 may include the locking member 260 provided to lock the pivot rotation of the display module 10.

When the user pivot-rotates the display module 10 and when the display module 10 is rotated without being sufficiently far away from the floor, there is a problem that the display module 10 may be likely to collide with the floor. In particular, this problem may be aggravated in a case in which the display module 10 is large.

In order to solve the above problem, the display apparatus 1 according to the present disclosure may include the locking member 260 provided on the support device 200 to be inserted into the locking portion 151 of the display case 100 when the display module 10 is located at a low height. In other words, the locking member 260 may lock the pivot rotation of the display module 10 so that the display module 10 may not pivot-rotate when the display module 10 is in the second position.

The locking member 260 may be provided to be movable in the front-rear direction to be inserted into or deviate from the locking portion 151. Specifically, the locking member 260 advances from the rear to the front of the display module 10 to be inserted into the locking portion 151 when the display module 10 moves from the first position to the second position, thereby locking the pivot rotation of the display module 10. In contrast, the locking member 260 retreats and deviates from the locking portion 151 when the display module 10 moves from the second position to the first position, thereby unlocking the pivot rotation of the display module 10.

In order for the locking member 260 to be provided to be movable in the front-rear direction, the locking member 260 may be disposed to be separated from the support arm 210 to be provided to be rotatable with respect to the support bracket 230. Instead, the locking member 260 may be provided to be movable on the support link 220 rotatably coupled to one end of the support arm 210. Because the support link 220 may be formed to keep the constant angle with respect to the support bracket 230, despite the rotation of the support arm 210, the locking member 260 may constantly advance or retreat in the front-rear direction. However, the present disclosure is not limited thereto, and the locking member 260 may be rotatably coupled to the support arm 210 and may be formed to be movable in the front-rear direction.

The locking member 260 may include a protrusion portion 261 provided to be inserted into the locking portion 151 and a body portion 262 extending rearward from the protrusion portion 261. In other words, the body portion 262 may extend from the protrusion portion 261 toward the support arm 210.

The body portion 262 may be bent from one end of the protrusion portion 261 and extend rearward. In particular, the protrusion portion 261 may be formed to extend long in the up-down direction to facilitate the tilt rotation of the display module 10 in the front-rear direction, and may be formed to extend downward from one end of a front side of the body portion 262 as illustrated in FIGS. 12 to 17. However, the protrusion portion 261 is not limited thereto and may have various shapes as long as the protrusion portion 261 may be inserted into the locking portion 151. For example, the protrusion portion 261 may extend upward from one end of the body portion 262, or may extend in the up-down direction, but the body portion 262 may be disposed between an upper end and a lower end of the protrusion portion 261. Or, the protrusion portion 261 may extend in the left-right direction.

Depending on a shape of the protrusion portion 261, when the protrusion portion 261 is inserted into the locking portion 151, the pivot rotation of the display module 10 about the plurality of rotation axes, such as the tilt rotation in the front-rear direction as well as the pivot rotation about the R1 axis, may be locked. Furthermore, the pivot rotation of the display module 10 in all directions may be locked.

In a case in which the locking member 260 is coupled to the support link 220, a support groove 264 may be formed on a coupling surface coupled to the support link 220. The support groove 264 may be provided such that the support protrusion 223 protruding from the support link 220 is inserted therein so that the locking member 260 is supported by the support link 220.

The support groove 264 may be formed to extend along a moving direction of the locking member 260. Accordingly, the locking member 260 may be movably supported by the support protrusion 223 inserted into the support groove 264.

The support groove 264 may be formed on the body portion 262. That is, the body portion 262 extends along the moving direction of the locking member 260, and the support groove 264 formed on the body portion 262 may also extend along the moving direction of the locking member 260.

However, the present disclosure is not limited thereto, and the locking member 260 may be supported in various ways to be movable according to the rotation of the support arm 210. For example, as described above, in a case in which the locking member 260 is rotatably coupled to the support arm 210 to move in the front-rear direction, a support protrusion protruding to be inserted into the support groove 264 of the locking member 260 may be formed on the support arm 210.

The locking member 260 and the locking portion 151 into which the locking member 260 may be inserted, which have been described above, may be referred to as the locking modules 151 and 260 in that the locking member 260 and the locking portion 151 function to lock or unlock the pivot rotation of the display module 10.

The support arm 210 may include a guide protrusion 215 provided to guide a movement of the locking member 260 as the support arm 210 rotates.

The guide protrusion 215 may be fixed to the support arm 210 to rotate integrally with the support arm 210.

Specifically, the guide protrusion 215 may be fixed to one end of the support arm 210 on the support link 220 side to guide the movement of the locking member 260.

The locking member 260 may include a guide groove 263 formed to allow the guide protrusion 215 to be inserted therein. The guide protrusion 215 may be inserted into or deviate from the guide groove 263 as the support arm 210 rotates to guide the locking member 260 to move.

The guide protrusion 215 is fixed to one end of the support arm 210, and may have a shape of protruding in a direction of being inserted into the guide groove 263 when the display module 10 moves from the second position to the first position. For example, the guide protrusion 215 may be provided to be insertable into the guide groove 263 by having a shape of protruding from a portion fixed to one end of the support arm 210 in a direction toward one end from the opposite other end of the support arm 210. In other words, the guide protrusion 215 may have a shape of protruding from one end of the support arm 210 on the support bracket 230 side toward the other end of the support arm 210 on the support link 220 side.

The guide protrusion 215 may be fixed to the link coupling part 211*a* of the rotating body 211. The guide protrusion 215 includes a portion protruding from the link coupling part 211*a* in a direction from the bracket coupling part 211*b* toward the link coupling part 211*a*, and the corresponding portion may be provided to be insertable into the guide groove 263.

The guide groove 263 may be concavely formed from a lower portion of the locking member 260 toward an upper portion thereof. In this case, the guide protrusion 215 may be inserted from below the guide groove 263 to guide the movement of the locking member 260.

The guide groove 263 may be formed to extend from the lower portion of the locking member 260 toward the rear of the locking member 260. In this case, when the support arm 210 rotates such that the display module 10 moves from the second position to the first position, the guide protrusion 215 also rotates in the same direction as the support arm 210 and may be easily inserted into the guide groove 263. In a process in which the guide protrusion 215 is inserted into the inside from the outside of the guide groove 263, the locking member 260 may move to the rear of the support device 200.

Conversely, when the support arm 210 rotates such that the display module 10 moves from the first position to the second position, the guide protrusion 215 also rotates in the same direction as the support arm 210 and may easily deviate out of the guide groove 263. In a process in which the guide protrusion 215 moves to the outside from the inside of the guide groove 263, the locking member 260 may move to the front of the support device 200.

The guide groove 263 may be formed on the body portion 262. Specifically, the guide groove 263 may be concavely formed from a lower portion of the body portion 262 toward an upper portion thereof. In this case, the body portion 262 may be located above the guide protrusion 215.

Additionally, the guide groove 263 may be formed to extend rearward from the lower part of the body portion 262. The effect of this is the same as described above.

The guide protrusion 215 is considered to be included in the locking modules 151, 215, and 260 in that the guide protrusion 215 functions to lock or unlock the pivot rotation of the display module 10 by guiding the operation of the locking member 260.

A plurality of the locking modules 151, 215, and 260 may be formed. Assuming a central plane crossing a center of the display apparatus 1 in the up-down direction, the plurality of locking modules 151, 215, and 260 may be arranged to be symmetrical with respect to the central plane.

The support link 220 may include a locking cover 224 provided to cover the locking member 260. In a case in which a plurality of the locking members 260 is provided, a plurality of the locking covers 224 may also be provided. As the locking cover 224 covers the locking member 260, the locking member 260 may be prevented from being separated from the support device 200, and the appearance quality may be improved. The locking cover 224 may also cover the guide protrusion 215.

As illustrated in FIGS. 15 to 17, when the support arm 210 rotates such that the display module 10 moves from the second position to the first position, the guide protrusion 215 may rotate to be inserted into the guide groove 263. The guide protrusion 215 may press the locking member 260 rearward while being inserted from the outside to the inside of the guide groove 263, and accordingly, the locking member 260 may retreat. In this process, the locking member 260 may deviate from the locking portion 151, and the rotation of the display module 10 may be unlocked.

Conversely, when the support arm 210 rotates such that the display module 10 moves from the first position to the second position, the guide protrusion 215 may rotate to deviate from the guide groove 263. The guide protrusion 215 may press the locking member 260 forward while rotating inside the guide groove 263, and accordingly, the locking member 260 may advance. In this process, the locking member 260 may be inserted into the locking portion 151, and the rotation of the display module 10 may be locked.

FIG. 16 illustrates that the locking member 260 is inserted into the locking portion 151 even when the display module 10 is located at the height illustrated in FIG. 16. The position of the display module 10 at which the pivot rotation of the display module 10 is locked may be determined differently depending on specifications of the display module 10, the support device 200, and the stand 300. The shapes of the locking modules 151, 215, and 260, including the locking member 260, may be formed differently depending on the position of the display module 10, which is designated to lock the pivot rotation according to the above criteria.

As illustrated in FIG. 18, the display module 10 may be provided to tilt-rotate in the front-rear direction. That the support device 200 includes the tilt link 240 such that the display module 10 may tilt-rotate in the front-rear direction is the same as described above.

On the other hand, when the display module 10 is in the first position as in the case of FIG. 18, as the locking member 260 deviates from the locking portion 151, the pivot rotation of the display module 10 may be unlocked, and the tilt rotation of the display module 10 in the front-rear direction may also be unlocked.

Additionally, even when the display module 10 is in the second position, the tilt rotation of the display module 10 in the front-rear direction may not be locked by the shapes of the passing holes 251*a* and 252*a* of the support plate 250 and the locking portion 151. However, the present disclosure is not limited thereto, and when the locking member 260 is inserted into the locking portion 151 and is restricted from moving, the display module 10 may not tilt-rotate in the front-rear direction.

As illustrated in FIG. 19, when the display module 10 is in the first position, the display module 10 may pivot-rotate about the R1 axis as a rotation axis with respect to the support device 200. Or, even in a case in which the display module 10 is located in a lower position than the first position, when the position is higher than the second position and is less likely to collide with the floor, the pivot rotation may be unlocked about the R1 axis of the display module 10 as a rotation axis.

FIG. 20 illustrates that the connector box of the display apparatus is coupled to the stand according to one or more embodiments.

Referring to FIG. 20, the connector box 500 of the display apparatus 1 may be detachably mounted on the stand body 310, unlike illustrated in FIG. 1. Specifically, the connector box 500 may be detachably attached to an outer surface of the stand body 310.

The connector box 500 may include a magnetic body. The magnetic body may be disposed on one surface of the connector box 500 mounted on the stand body 310, or may be disposed inside the connector box 500 to be adjacent to the one surface of the connector box 500. The magnetic body provided in the connector box 500 may be a magnet.

Correspondingly, the stand body 310 may be configured such that at least a portion of the outer surface to which the connector box 500 is attached includes a magnetic body. Specifically, the stand body 310 may be configured such that at least the outer surface to which the connector box 500 is attached includes a magnetic body metal material such as iron. Alternatively, the stand body 310 may include a magnet.

With the above configuration, the connector box 500 may be detachably mounted on the stand body 310. As illustrated in FIG. 20, the connector box 500 may be mounted on the stand body 310 so that a lower surface of the connector box 500 is in contact with a stand rear panel 313 of the stand body 310. However, the present disclosure is not limited thereto, and the connector box 500 may be mounted on the stand body 310 in various ways.

FIGS. 21 and 22 illustrate a process in which the display apparatus is coupled to the wall mount bracket according to one or more embodiments. FIG. 23 illustrates that the display apparatus in FIG. 21 is mounted on a wall according to one or more embodiments.

Referring to FIGS. 21 to 23, the display apparatus 1 may be coupled to the wall mount bracket 400 to be mounted on a wall.

The display module 10 of the display apparatus 1 may be supported by a support device 200 coupled to the support object, and herein, the support object may refer to the stand body 310 that may be fixed to the wall.

The display apparatus 1 may include the wall mount bracket 400 to become the wall-mounted display apparatus 1. The wall mount bracket 400 may be fastened and fixed to the wall. Specifically, the wall mount bracket 400 may include a wall fastening portion 430 to be fastened to the wall with screws.

The wall mount bracket 400 may include a bracket body 410 and a stand mounting part 420 provided on the bracket body 410 to be coupled to the stand body 310. The wall fastening portion 430 described above may be formed on the bracket body 410.

The bracket body 410 may be formed to have a flat plate shape to facilitate coupling to the wall.

The stand mounting part 420 may be formed to have a hook shape. Accordingly, the stand body 310 may be mounted on the wall mount bracket 400 by being hook-coupled to the stand mounting part 420. The stand mounting part 420 may have a shape of protruding upward.

The stand body 310 may be fastened to the stand plate 320 illustrated in FIG. 1 through the screw fastening hole 317, and conversely, the stand body 310 may be separated from the stand plate 320. Before the stand body 310 is coupled to the wall mount bracket 400 as in the case of FIGS. 21 to 23, the stand plate 320 provided such that the stand 300 is supported on the floor may be separated from the stand body 310.

The stand rear panel 313 of the stand body 310 may be provided to be detachable from the stand body 310. The stand body 310 may include a bracket seating portion 314 on which the wall mount bracket 400 is seated and a bracket fastening groove 315 into which the wall mount bracket 400 is fastened. When the stand rear panel 313 is separated from the stand body 310, the bracket seating portion 314 and the bracket fastening groove 315 may be exposed on the rear surface of the stand body 310.

Accordingly, the stand rear panel 313 may be separated before the stand body 310 is mounted on the wall mount bracket 400. However, the present disclosure is not limited thereto, and in a case in which the bracket seating portion 314 and the bracket fastening groove 315 are provided on the stand rear panel 313, the wall mount bracket 400 may be coupled to the stand body 310 even when the stand rear panel 313 is not separated.

The wall mount bracket 400 may be seated on the bracket seating portion 314, and in particular, the bracket body 410 of the wall mount bracket 400 may be seated thereon. The bracket seating portion 314 may be formed to include a shape corresponding to a shape of the bracket body 410, and may specifically include a flat plate shape corresponding to the shape of the bracket body 410. Accordingly, the wall mount bracket 400 may support the stand body 310 more stably.

The bracket fastening groove 315 may be formed to include a concave shape so that the wall mount bracket 400 may be hook-coupled thereto. Specifically, the bracket fastening groove 315 may be formed to be concave from the rear surface to the front of the stand body 310 and extend upward. Accordingly, the stand mounting part 420 of the wall mount bracket 400 may be easily inserted into and hook-coupled to the bracket fastening groove 315.

As illustrated in FIG. 21, the stand rear panel 313 may be separated from the stand body 310, and as illustrated in FIG. 22, the stand body 310 may be mounted on the wall mount bracket 400 fastened to the wall through the stand mounting part 420 and the bracket fastening groove 315. In this manner, the display apparatus 1 may become the wall-mounted type display apparatus 1 mounted on a wall as illustrated in FIG. 23.

The lower end of the stand body 310 may be provided with a connector penetrating portion 316 through which the connector 500*a* passes. The connector penetrating portion 316 may be formed around a side where a lower surface and the rear surface of the stand body 310 are connected. In other words, the connector penetrating portion 316 allows the connector 500*a* to penetrate the lower and rear surfaces of the stand body 310, respectively, and a hole through which the connector 500*a* penetrates may be formed integrally. Accordingly. the connector 500*a* may extend rearward through the connector penetrating portion 316 when the stand plate 320 is coupled to the stand body 310 as in the case of FIG. 1, and may extend downward through the connector penetrating portion 316 when the stand plate 320 is separated from the stand body 310 as in the case of FIG. 23.

According to the above configuration, the display apparatus 1 according to one or more embodiments may support the display module 10 by including the support device 200 coupled to the support object such as the stand body 310. The support device 200 may be provided such that the display apparatus 1 may pivot-rotate. Additionally, the support device 200 may include the locking member 260 provided to be inserted into the locking portion 151 of the display case 100. Accordingly, the pivot rotation of the display module 10 may be unlocked when the display module 10 is in the first position and locked when the display module 10 is in the second position. The display apparatus 1 may be supported by the stand 300, or the wall mount bracket 400 fastened to a wall, depending on a selection of the user.

While example embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A display apparatus comprising:
- a display module comprising:
  - a display panel; and
  - a display case supporting the display panel and comprising a locking portion; and
- a support device supporting a rear of the display module and configured to enable pivot rotation of the display module,
- wherein the support device comprises:
  - a support arm configured to be rotatably coupled to a support object and enable the display module to move between a first position and a second position at a lower height than the first position, and
  - a locking member inserted into the locking portion and configured to lock the pivot rotation of the display module when the display module is in the second position.

2. The display apparatus according to claim 1, wherein the display case comprises:
- a rear cover on a rear of the display panel; and
- a fixed plate fixed to the rear cover and configured to enable pivot rotation with respect to the support device, and
- wherein the locking portion is provided on the fixed plate.

3. The display apparatus according to claim 2, wherein the locking portion is provided on a rear surface of the fixed plate facing the rear cover.

4. The display apparatus according to claim 1, wherein the locking member is configured to move from the rear to a front of the display module when the display module moves from the first position to the second position.

5. The display apparatus according to claim 1, wherein the locking portion comprises a locking groove concavely formed, and
- wherein the locking member is configured to be inserted in the locking groove when the display module is in the second position.

6. The display apparatus according to claim 1, wherein the support device further comprises a support plate rotatably coupled to a rear of the display case, and
- wherein the support plate comprises a passing hole configured to allow the locking member to pass through.

7. The display apparatus according to claim 1, wherein the support arm comprises a guide protrusion configured to rotate integrally with the support arm,
- wherein the locking member comprises a guide groove configured to have the guide protrusion inserted therein, and
- wherein the guide protrusion is further configured to guide the locking member to move to an opposite side of the locking portion while being inserted into the guide groove, and guide the locking member to move toward the locking portion while deviating from the guide groove.

8. The display apparatus according to claim 7, wherein the guide groove is concavely formed from a lower portion toward an upper portion of the locking member, and wherein the guide protrusion is inserted from below the guide groove.

9. The display apparatus according to claim 8, wherein the guide groove extends from the lower portion of the locking member toward a rear of the locking member.

10. The display apparatus according to claim 7, wherein the locking member comprises:

a protrusion portion configured to be insertable into the locking portion; and a body portion extending from the protrusion portion toward the support arm, and wherein the guide groove is provided on the body portion.

11. The display apparatus according to claim 1, wherein the support device comprises:

a support bracket to which a first end of the support arm is rotatably coupled and configured to be fixed to the support object, and a support link rotatably coupled to a second end of the support arm on the support bracket, and wherein the locking member is movably coupled to the support link.

12. The display apparatus according to claim 11, wherein the locking member comprises a support groove on a coupling surface coupled to the support link and extending along a moving direction of the locking member, and wherein the support link comprises a support protrusion configured to be inserted into the support groove and movably support the locking member.

13. The display apparatus according to claim 11, wherein the support arm comprises a plurality of link frames adjacent to each other in an up-down direction, and wherein the plurality of link frames connects the support link and the support bracket so that the support link maintains a constant angle with respect to the support bracket.

14. The display apparatus according to claim 11, wherein the pivot rotation that is locked when the display module is in the second position is a pivot rotation that rotates about a rotation axis extending in a front-rear direction of the display module, and wherein the support device further comprises a tilt link connecting the display module and the support link and rotatably coupled to the support link, the tilt link being configured to enable the display module to tilt in the front-rear direction.

15. The display apparatus according to claim 1, wherein the support arm comprises a piston cylinder configured to reinforce support of the display module by the support arm when the display module moves between the first position and the second position.

16. A display apparatus comprising:

a display module comprising:

a display panel; and a display case supporting the display panel; and a support device supporting the rear of the display module so that the display module is movable between a first position and a second position at a different height from the first position, wherein the support device comprises:

a locking member configured to move forward when the display module moves from the first position to the second position and to move backward when the display module moves from the second position to the first position, wherein the locking member is configured:

to unlock the display module so that the display module enables pivot rotation based on the display module is in the first position, and to lock the display module so that the display module prevents the pivot rotation based on the display module is in the second position, wherein the display case comprises a locking groove provided to allow the locking member to deviate therefrom based on the display module is in the first position and to allow the locking member to be inserted therein based on the display module is in the second position, the locking groove provided at a rear of the display case.

17. The display apparatus according to claim 16, wherein the support device further comprises:

a support bracket configured to be fixed to a support object;

a support arm rotatably coupled to the support bracket; and a support link rotatably coupled to one end of the support arm on the display module side, and wherein the support arm comprises a plurality of link frames connecting the support link and the support bracket so that the support link maintains a constant angle with respect to the support bracket, the plurality of link frames being adjacent to each other in an vertical direction.

18. The display apparatus according to claim 16, wherein the pivot rotation that is locked when the display module is in the second position is a pivot rotation that rotates about a rotation axis from the rear toward the front of the display module, and the support device further comprises a tilt link connecting the display module and a support link, and coupled to be rotatable in the vertical direction with respect to the support link, the tilt link being configured to enable the display module to tilt in a front-rear direction.

19. A display apparatus comprising:

a display module comprising:

a display panel; and a display case supporting the display panel;

a support device supporting the display module and comprising a support arm configured to be rotatably coupled to a support object so that the display module is movable between a first position and a second position at a lower height than the first position; and a locking module comprising a locking groove provided in the display case and a locking member provided in the support device, wherein the locking module is configured:

to allow the display module to pivot-rotate with respect to the support arm by deviating the locking member from the locking groove based on the display module is in the first position, and to prevent the display module from pivot-rotating with respect to the support arm by inserting the locking member into the locking groove based on the display module is in the second position.

* * * * *